United States Patent
Hirasawa

(12) 
(10) Patent No.: US 6,580,453 B1
(45) Date of Patent: Jun. 17, 2003

(54) IMAGE SENSING APPARATUS

(75) Inventor: Masahide Hirasawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/954,374

(22) Filed: Oct. 20, 1997

(30) Foreign Application Priority Data

Oct. 25, 1996 (JP) .............................................. 8-284055
Dec. 27, 1996 (JP) .............................................. 8-351250
Mar. 14, 1997 (JP) .............................................. 9-061342

(51) Int. Cl.$^7$ ............................................. H04N 5/232
(52) U.S. Cl. ................ 348/211.99; 348/211.6
(58) Field of Search ................. 348/211, 213,
348/207, 335, 344, 345, 373, 374, 375,
348, 337–340, 36–39, 14.1–14.16, 216.1,
341, 207.99, 211.99, 211.2, 195, 202, 203,
211.6; 396/56, 57, 59, 109, 106, 58, 55;
250/201.2, 201.3, 201.4; 359/592, 593,
849, 850, 855, 868, 629, 355; 235/462.4,
462.9, 462.11, 470

(56) References Cited

U.S. PATENT DOCUMENTS

| | | | | |
|---|---|---|---|---|
| 3,668,406 A | * | 6/1972 | Reid et al. ................... 359/629 |
| 4,482,920 A | * | 11/1984 | Yoshida et al. ............. 348/363 |
| 4,523,828 A | * | 6/1985 | Kato ........................ 250/201.4 |
| 4,626,905 A | * | 12/1986 | Schmidt ...................... 348/36 |
| 4,818,865 A | * | 4/1989 | Matsui et al. ............. 250/201.2 |
| 5,014,080 A | * | 5/1991 | Miyadera ..................... 396/59 |
| 5,172,155 A | * | 12/1992 | Kosaka ........................ 396/59 |
| 5,198,849 A | * | 3/1993 | Hirai ............... 396/57 |
| 5,305,041 A | * | 4/1994 | Ichikawa et al. .............. 396/59 |
| 5,361,115 A | * | 11/1994 | Ohtsuka et al. ................ 396/58 |
| 5,515,100 A | * | 5/1996 | Nogo .......................... 348/211 |
| 5,517,276 A | * | 5/1996 | Higaki et al. ................. 396/56 |
| 5,634,144 A | * | 5/1997 | Mauro et al. .................. 396/57 |
| 5,715,480 A | * | 2/1998 | Nonaka ........................ 396/59 |
| 5,717,195 A | * | 2/1998 | Feng et al. ................. 235/470 |
| 5,734,428 A | * | 3/1998 | Suda et al. .................. 348/341 |
| 5,847,859 A | * | 12/1998 | Murata ........................ 359/849 |

FOREIGN PATENT DOCUMENTS

JP 2-135310 * 5/1990

* cited by examiner

Primary Examiner—Aung S. Moe
(74) Attorney, Agent, or Firm—Morgan & Finnegan, LLP

(57) ABSTRACT

The case of an image sensing apparatus such as a video camera is simplified by reducing the number of parts provided on the surface of the apparatus without eliminating a remote-control function. The video camera is formed to have an opening for introducing sensed light from a subject and first remote-control signal light which remotely controls the video camera into the interior of the camera case, and for projecting second remote-control signal light, by which the video camera remotely controls an external apparatus, to the exterior of the camera. After the first remote-control signal light is introduced into the interior of the camera case via the opening, the light is received by a remote-control light-receiving element and the second remote-control signal light is projected to the exterior of the camera case via the opening. As a result, the first remote-control signal light and the second remote-control signal light can be made to traverse the same optical path as that of the sensed light from the subject. This makes it unnecessary to provide the surface of the camera case with a window for the first remote-control signal light and second remote-control signal light.

20 Claims, 24 Drawing Sheets

PRIOR ART

PRIOR ART

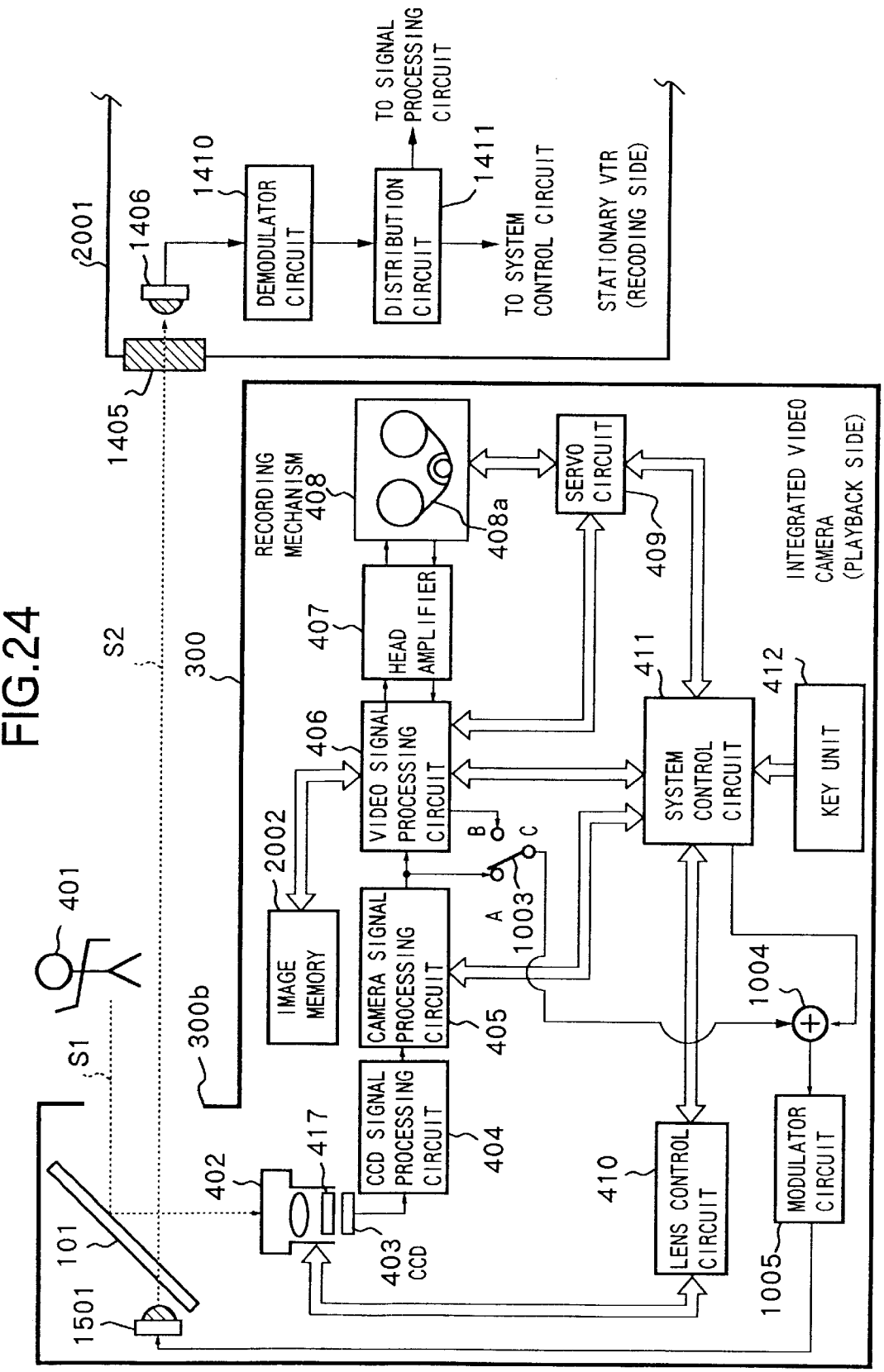

IMAGE SENSING APPARATUS

BACKGROUND OF THE INVENTION

This invention relates to an image sensing apparatus. More particularly, the invention relates a compact image sensing apparatus having a remote-control function.

FIG. 11 is a schematic view showing an example of a widely used integrated video recorder and camera (referred to also as an "integrated video camera" below) equipped with a 20× magnification zoom lens. As shown in FIG. 11, an integrated video camera of this kind is such that the overall optical length of the lens occupies more than half the total length of the product. Since it has become essential for recent video cameras and still-video cameras to be equipped with zoom lenses of higher magnifications, the proportion of total product length occupied by the total lens length is expected to grow.

A function that can be mentioned as a requisite for such cameras in addition to the zoom lens is a remote-control function. For example, as shown in FIG. 12, a typical arrangement includes a remote-control signal receiving window 413 provided on the case of the image sensing apparatus. The window 413 allows the selective transmission of infrared light for a remote-control signal and is internally equipped with a remote-control light-receiving element. The element receives modulated infrared light corresponding to an instruction from a remote controller 650.

FIG. 13 is a functional block useful in describing an example of the function of an integrated video camera having the remote-control function of the kind shown in FIGS. 11 and 12. Shown in FIG. 13 are a subject 401, an image sensing lens 402, a CCD device 403 provided as a photoelectric transducer, and a CCD signal processing circuit 404 for applying prescribed signal processing to the output of the CCD device 403.

A camera signal processing circuit 405 generates a video signal from the output signal of the CCD signal processing circuit 404, and a video signal processing circuit 406 generates a recording signal for the purpose of recording the output signal of the camera signal processing circuit 405 on video tape. The recording signal is applied to a head amplifier 407. A recording mechanism 408 records the output signal of the head amplifier 407 on video tape via an electromagnetic conversion system.

A servo circuit 409 is for driving,the recording mechanism 408 by a prescribed operation. A lens control circuit 410 drives the image sensing lens 402 and a system control circuit 411 controls the overall video camera. A key unit 412 has a group of switches belonging to the main body. A remote-control light-receiving window 413 receives infrared radiation from the remote controller 650. A remote-control light-receiving element 414 is connected to an amplifier circuit 415 which amplifies the output of the element. The system control circuit 411 is connected to each of these blocks by communication lines for the purpose of controlling the overall system in accordance with signals from the key unit 412 and remote-control light-receiving element 414.

Further, as shown in FIG. 14, it is possible to provide an infrared cutting filter 416 and a low-pass filter 417 for transmitting only the visible light contained in the light entrant via a lens barrel 402.

It is evident from the foregoing discussion of video cameras that there is increasing demand for an image sensing apparatus to be provided with additional functions. This means that an increase in lens size and the inclusion of a remote-control light-receiving element for remote control cannot be avoided. On the other hand, however, there is also increasing demand for an image sensing apparatus that is more compact. How to achieve more compactness while providing a longer lens for greater magnification as well as a remote-control light-receiving element is an important problem awaiting solution.

In the pursuit of a more compact image sensing apparatus, a point which is just as important as a reduction in the size of components is simplification of the apparatus case by minimizing the number of parts provided on the surface of the sensing apparatus case.

SUMMARY OF THE INVENTION

An object of the present invention is to so arrange it that the case of an image sensing apparatus can be simplified by reducing the number of parts provided on the surface of the apparatus without eliminating the remote-control function.

According to the present invention, the foregoing object is attained by providing an image sensing apparatus having an opening for introducing sensed light from a subject and signal light into the interior of a case, and a light-receiving element for receiving the signal light, within the interior of the case, which has been introduced into the case via the opening.

According to another aspect of the invention, the foregoing object is attained by providing an image sensing apparatus having an opening for introducing sensed light from a subject and signal light into the interior of a case, a light-receiving element for receiving the signal light, within the interior of the case, which has been introduced into the case via the opening, and optical path bending means for bending the optical path of the signal light, wherein the signal light bent by the optical path bending means is received by the light-receiving element.

Further, the optical path bending means bends the signal light by approximately 90°.

Further, the optical path bending means is constituted by an element having a property which reflects light of a specific wavelength corresponding to wavelength of the signal light.

According to another aspect of the invention, the foregoing object is attained by providing an image sensing apparatus having an opening for introducing sensed light from a subject and signal light into the interior of a case, an image sensing lens for receiving, within the interior of the case, the sensed image light from the subject that as entered the interior of the case via the opening, a light-receiving element for receiving the signal light, within the interior of the case, which has been introduced into the case via the opening, and optical path bending means for bending the optical path of the sensed light from the subject and the optical path of the signal light, wherein after the bending of optical path by the optical path bending means is performed, the sensed light from the subject is received by the image sensing lens and the signal light is received by the light-receiving element.

Further, the optical path bending means bends the sensed light from the subject and the signal light by approximately 90°.

Further, a portion of the optical path bending means that bends the signal light is constituted by an element having a property which reflects light of a specific wavelength corresponding to wavelength of the signal light.

According to another aspect of the invention, the foregoing object is attained by providing an image sensing apparatus having a light-emitting element for emitting signal light, and an opening for leading the signal light, which is emitted by the light-emitting element, to the exterior of a case, and for introducing sensed light from a subject into the interior of the case.

According to another aspect of the invention, the foregoing object is attained by providing an image sensing apparatus having a light-emitting element for emitting signal light, an opening for leading the signal light, which is emitted by the light-emitting element, to the exterior of a case, and for introducing sensed light from a subject into the interior of the case, and optical path bending means for bending the optical path of the signal light, wherein the signal light, after being bent by the optical path bending means, is led to the exterior of the case via the opening.

Further, the optical path bending means bends the signal light by approximately 90°.

Further, the optical path bending means is constituted by an element having a property which reflects light of a specific wavelength corresponding to wavelength of the signal light.

According to another aspect of the invention, the foregoing object is attained by providing an image sensing apparatus having a light-emitting element for emitting signal light, an opening for leading the signal light, which is emitted by the light-emitting element, to the exterior of a case, and for introducing sensed light from a subject into the interior of the case, an image sensing lens for receiving, within the interior of the case, the sensed image light from the subject that as entered the interior of the case via the opening, and optical path bending means for bending the optical path of the sensed light from the subject and the optical path of the signal light, wherein after the bending of optical path by the optical path bending means is performed, the sensed light from the subject is received by the image sensing lens and the signal light from the light-emitting element is led to the exterior of the case via the opening.

Further, the optical path bending means bends the sensed light from the subject and the signal light from the light-emitting element by approximately 90°.

Further, a portion of the optical path bending means that bends the signal light is constituted by an element having a property which reflects light of a specific wavelength corresponding to wavelength of the signal light.

According to another aspect of the invention, the foregoing object is attained by providing an image sensing apparatus having a light-emitting element for emitting signal light, an opening for leading the signal light, which is emitted by the light-emitting element, to the exterior of a case, and for introducing sensed light from a subject and signal light from the exterior into the interior of the case, and a light-receiving element for receiving the signal light, which has been introduced into the interior of the case via the opening, in the interior of the case.

According to another aspect of the invention, the foregoing object is attained by providing an image sensing apparatus having a light-emitting element for emitting signal light, an opening for leading the signal light, which is emitted by the light-emitting element, to the exterior of a case, and for introducing sensed light from a subject and signal light from the exterior into the interior of the case, a light-receiving element for receiving the signal light, which has been introduced into the interior of the case via the opening, in the interior of the case, and optical path bending means for bending the optical path of the signal light, wherein the signal light bent by the optical path bending means is received by the light-receiving element and the signal light emitted by the light-emitting element is led to the exterior of the case via the opening after the optical path of the light signal is bent by the optical path bending means.

Further, the optical path bending means bends the signal light by approximately 90°.

Further, the optical path bending means is constituted by an element having a property which reflects light of a specific wavelength corresponding to wavelength of the signal light.

According to another aspect of the invention, the foregoing object is attained by providing an image sensing apparatus having a light-emitting element for emitting signal light, an opening for leading the signal light, which is emitted by the light-emitting element, to the exterior of a case, and for introducing sensed light from a subject and signal light from the exterior into the interior of the case, a light-receiving element for receiving the signal light, which has been introduced into the interior of the case via the opening, in the interior of the case, optical path bending means for bending the optical path of the sensed light from the subject and the optical path of the signal light, and an image sensing lens for receiving, in the interior of the case, sensed light from the subject that has entered the interior of the case via the opening, wherein after the sensed light from the subject and the signal light from the exterior is bent by the optical path bending means, the sensed light and the signal light is received by the image sensing lens and light-receiving element, respectively, and after the signal light emitted by the light-emitting element is bent by the optical path bending means, this signal light is led to the exterior of the case via the opening.

Further, the optical path bending means bends the sensed light from the subject and the signal light from the light-emitting element by approximately 90°.

Further, a portion of the optical path bending means that bends the signal light is constituted by an element having a property which reflects light of a specific wavelength corresponding to wavelength of the signal light.

Further, the image sensing apparatus is further provided with transmitting means for wirelessly transmitting an audio signal and a video signal to an apparatus external to the case.

The transmitting means combines a remote-control signal, which is for remotely controlling the operation of the apparatus external to the case, the audio signal and the video signal, modulates the combined signal according to a configuration conforming to the apparatus external to the case, converts the modulated signal to a light signal and transmits the light signal.

Further, according to the invention, the signal light is signal light for remote control.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 24 is a structural view showing an 18th embodiment of the present invention.

DESCRIPTION OF THE PREFERRED EMBODIMENTS (First Embodiment)

Figure 1:
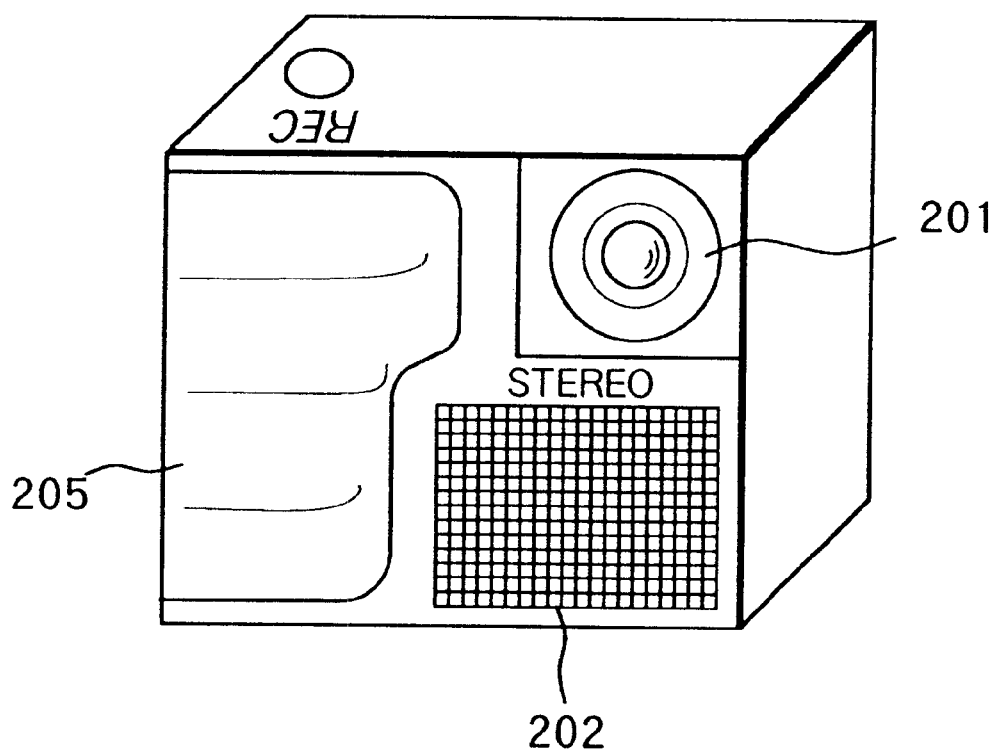
FIG. 1 is an external perspective view illustrating an image sensing apparatus which applies to each of the embodiments of the invention.

FIG. 1 is an external perspective view illustrating an image sensing apparatus having the characterizing features of the present invention. When the image sensing apparatus is viewed from the side of the subject, as in FIG. 1, an image 201 of an image sensing lens is visible (here the lens is not being looked at directly). The apparatus further includes a microphone unit 202 for capturing audio, and a grip portion 203 by which the photographer holds the apparatus.

Figure 11:
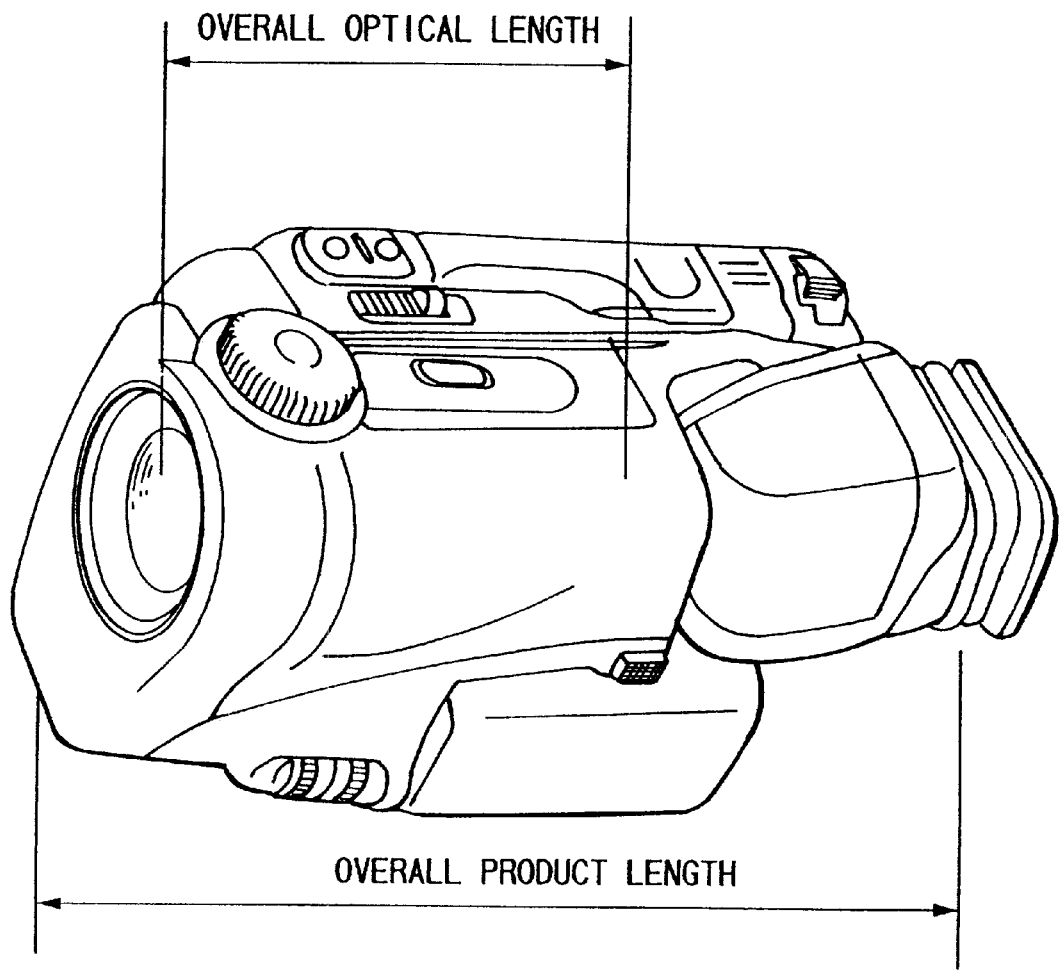
FIG. 11 is an external perspective view of an image sensing apparatus illustrative of an example of a conventional video camera.
Figure 12:
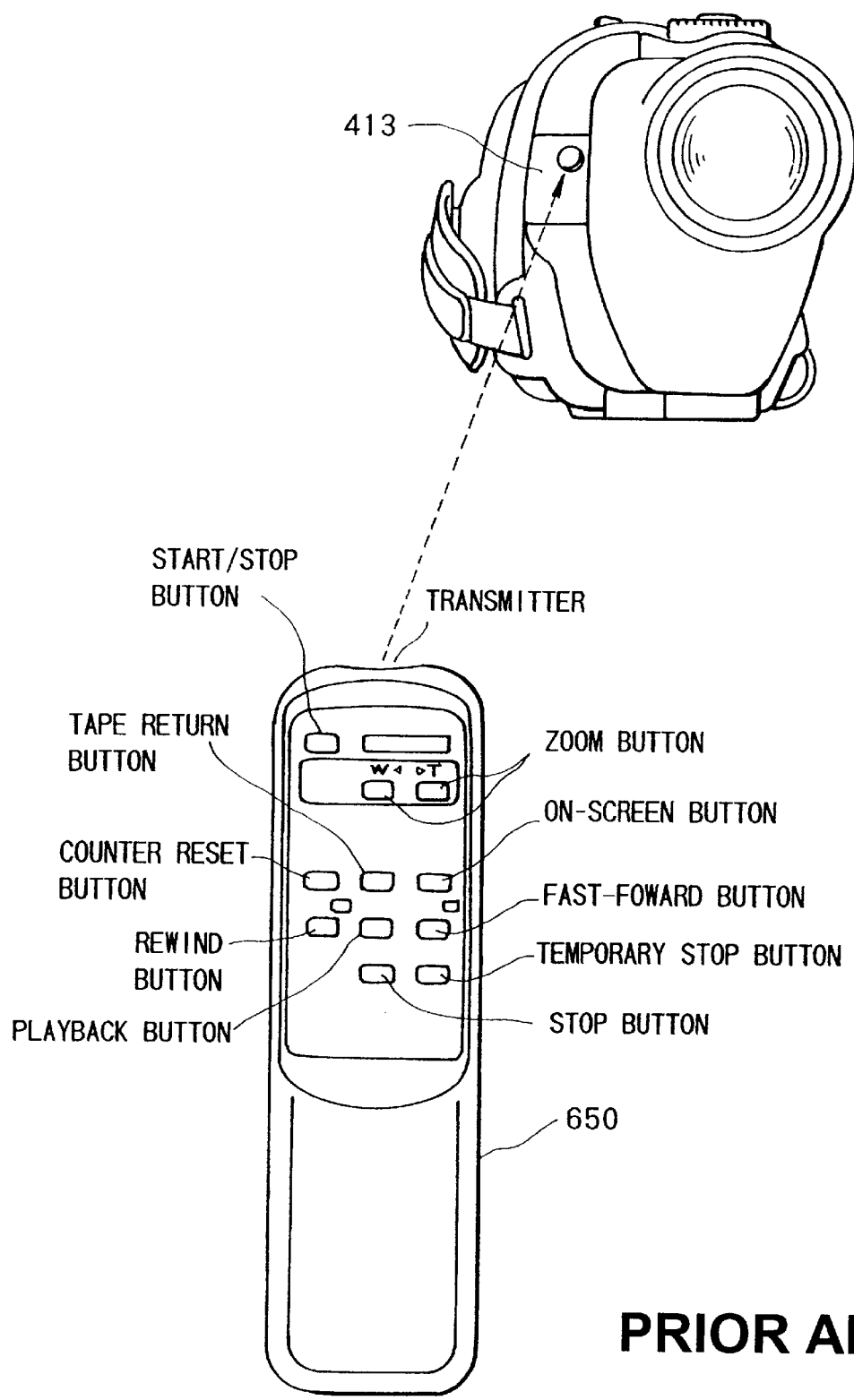
FIG. 12 is a diagram showing the external appearance of remote-control signal transmitter as well as the manner in which infrared light serving as a remote-control signal is sent from the transmitter to a window on the external case of an image sensing apparatus.

An important feature of the image sensing apparatus according to the embodiment constructed as shown in FIG. 1 is that the length of the apparatus in the direction of the subject is much smaller in comparison with that of the conventional image sensing apparatus typified by FIG. 11. This makes it possible to realize a highly compact image sensing apparatus. That is, as will be described later in greater detail, the highest priority is given to accommodating the lens in a case 102 which is comparatively small in the depth direction, and less priority is given to pointing the lens directly at the subject, as a result of which a more compact apparatus is obtained.

More specifically, in order to introduce sensed light S1 from a subject to the optic axis of a lens not pointing directly at the subject, the light S1 is temporarily bent by reflecting means such as a reflecting mirror or prism, whereby the light is made to impinge upon the lens along its optic axis.

In order to pursue compactness to the greatest extent possible, in this embodiment a remote-control light-receiving window is not provided on the surface of the image sensing apparatus on the subject side, as illustrated in FIG. 1. However, a remote-control light-receiving window is not something which may be provided on the side, top or back of the apparatus. The reason for this is that there occasions where the photographer stands in front of a camera in order to be captured as the subject of photography. Accordingly, it is desired that infrared light emitted by a remote controller held by the photographer be formed on a plane the same as that which introduces the sensed light S1 (FIG. 2) from the subject to the apparatus proper. In other words, it is required that the infrared light for remote control purposes be received at the front side of the apparatus proper. This means that providing the light-receiving window on the side, top or back of the apparatus is not practical.

Figure 2:
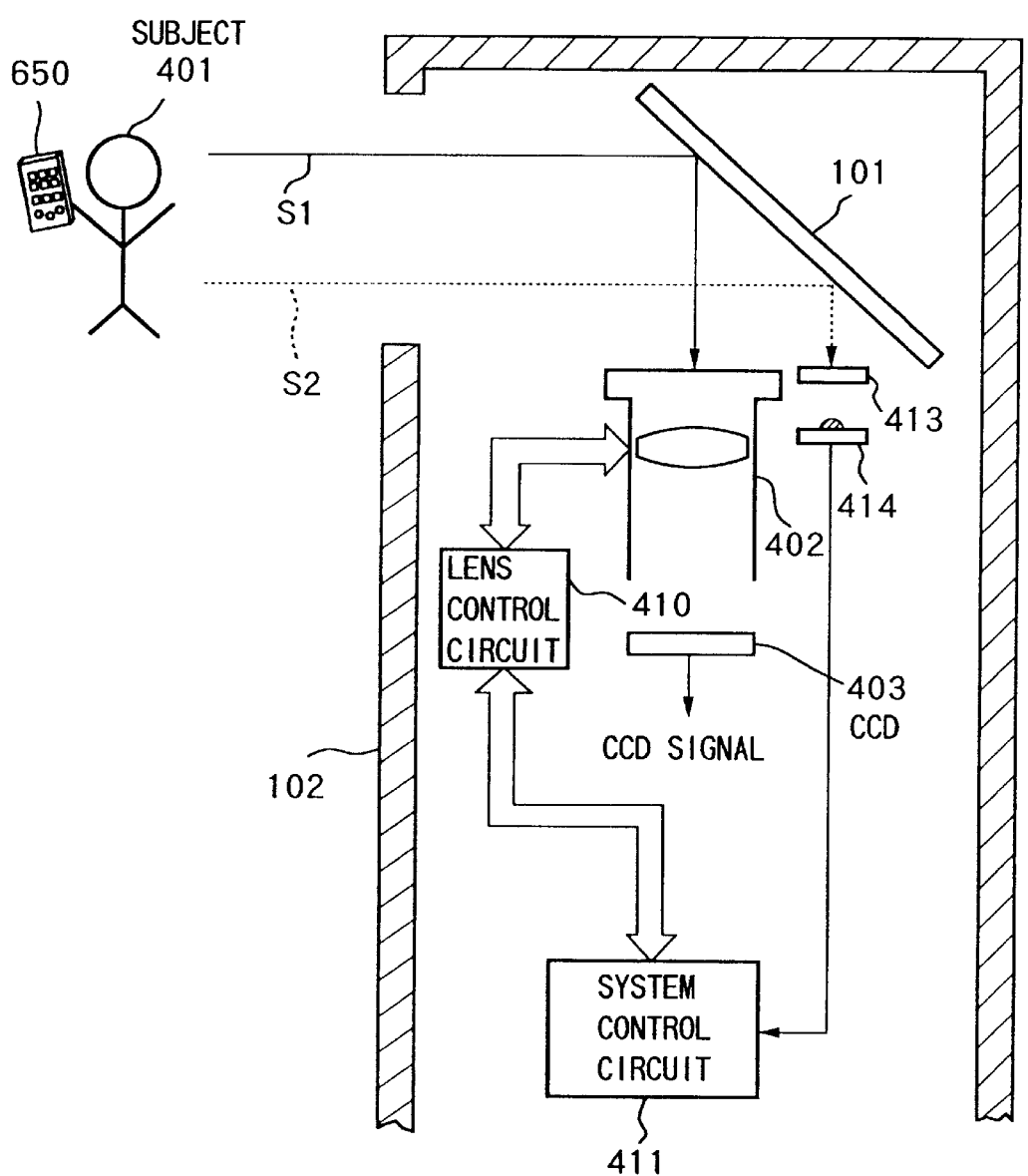
FIG. 2 is a diagram illustrating the internal structure of an image sensing apparatus according to a first embodiment.

Reference will be had to FIG. 2 to describe a method of receiving remote-control infrared light in an image sensing apparatus according to the embodiment constructed as shown in FIG. 1.

Figure 13:
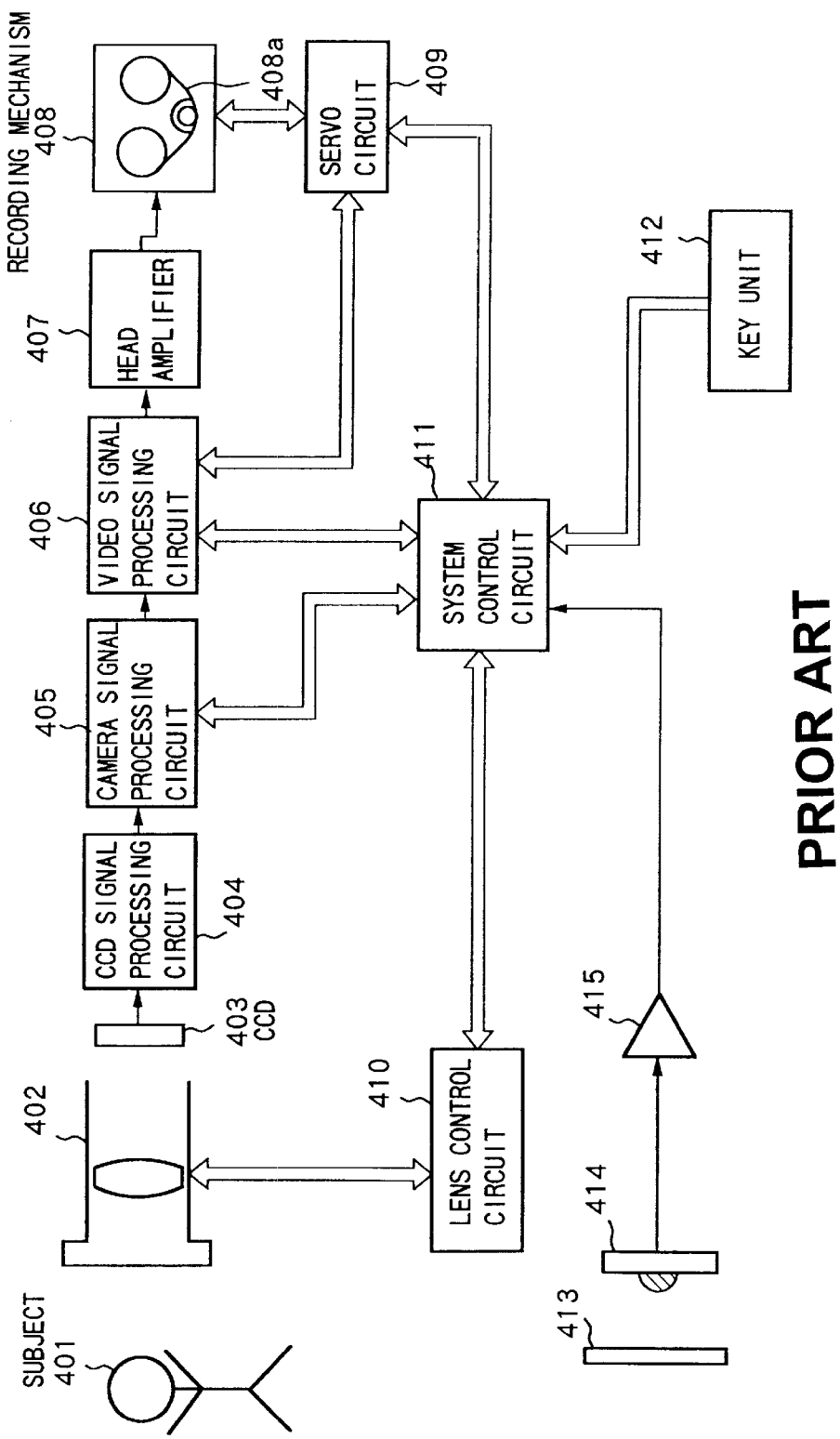
FIG. 13 is a functional block diagram for describing the function of a video camera having a remote-control function.

FIG. 2 is a diagram illustrating an example of an image sensing optical system and peripheral components in the image sensing apparatus shown in FIG. 1. Blocks having functions identical with those shown in the image sensing apparatus of FIG. 13 are designated by like reference numerals. Further, though the connections between blocks are in line with the image sensing apparatus shown in FIG. 13, the connections are not shown in FIG. 2 for the sake of simplicity.

In this embodiment, as shown in FIG. 2, it is so arranged that a sensed light ray S1 from the subject 401 and a remote-control signal light ray S2 from the remote controller 650 are both introduced into a case 102 via an opening 100. The sensed light S1 from the subject 401 is reflected by a mirror 101, whereby the optic axis of the light is bent approximately 90° such that the light is introduced to the lens barrel 402. The sensed light S1 from the subject thus introduced to the lens barrel 402 is subjected to a photo-electric conversion, a variety of signal processing and processing such as an electromagnetic conversion, in a manner similar to that shown in FIG. 13, before being recorded on tape (not shown).

Similarly, the remote-control signal light S2 has its optic axis bent by approximately 90° by the mirror 101 so that the light S2 is introduced to the remote-control light-receiving element 414 via the remote-control light-receiving window 413 provided in the vicinity of the lens barrel 402. The output signal of the remote-control light-receiving element 414 also enters the system control circuit 411 in a manner similar to that described above in conjunction with FIG. 13.

In this embodiment, as set forth above, the arrangement is such that the optic axes of the sensed light S1 from the subject and the remote-control signal light S2 are bent by 90° using the mirror 101 provided in order to make the image sensing apparatus more compact. As a result, it is possible to provide the apparatus with a remote control function while maintaining compactness by so arranging it that the remote-control light-receiving window 413 need not be formed on the surface of the case 102.

(Second Embodiment)

Figure 3:
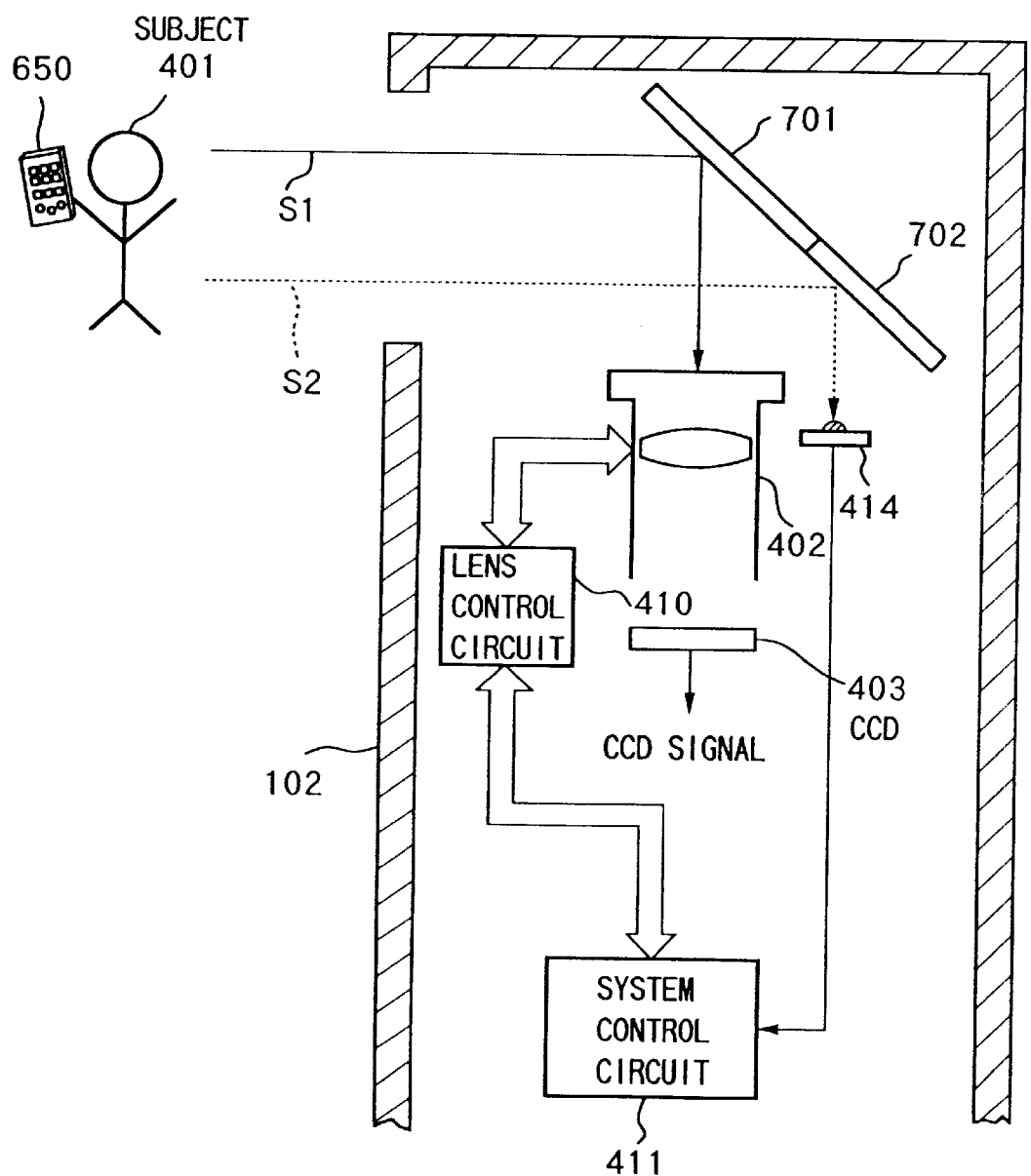
FIG. 3 is a diagram illustrating the internal structure of an image sensing apparatus according to a second embodiment.

FIG. 3 is a diagram illustrating an example of an image sensing optical system and peripheral components in a camera apparatus according to a second embodiment of the present invention. Blocks having functions the same as those shown in FIG. 2 are designated by like reference numerals.

As in the first embodiment, the sensed light S1 from the subject 401 is introduced to the image sensing lens 402 by having its optical path bent by a mirror 701. A dichroic mirror 702 which reflects only the infrared region is provided alongside the mirror 701 at a position offset from the optical path of the sensed light S1 from the subject captured by the image sensing lens 402. The remote-control signal light S2, which has been reflected by the dichroic mirror 702, is introduced to the remote-control light-receiving element 414.

If the infrared light reflecting characteristic of the dichroic mirror 702 is made to match the infrared light transmitting characteristic of the remote-control light-receiving window 413, it is no longer necessary to provide the remote-control light-receiving window 413 inside the case 102 and the apparatus can be made even more compact. Though the mirror 701 and dichroic mirror 702 are placed on the same plane in this case, they need not necessary be placed on the same plane.

(Third Embodiment)

In the first and second embodiments described above, the sensed light S1 and the remote-control signal light S2 that has entered the interior of the case 102 is bent by bending means, whereby the length of the image sensing apparatus in the direction of the subject is shortened. However, even if the bending means such as the mirror 101 or the mirror 701 and dichroic mirror 702 is not provided, it can be so arranged that the remote-control light-receiving window 413 need not be provided on the surface of the case 102.

Figure 4:
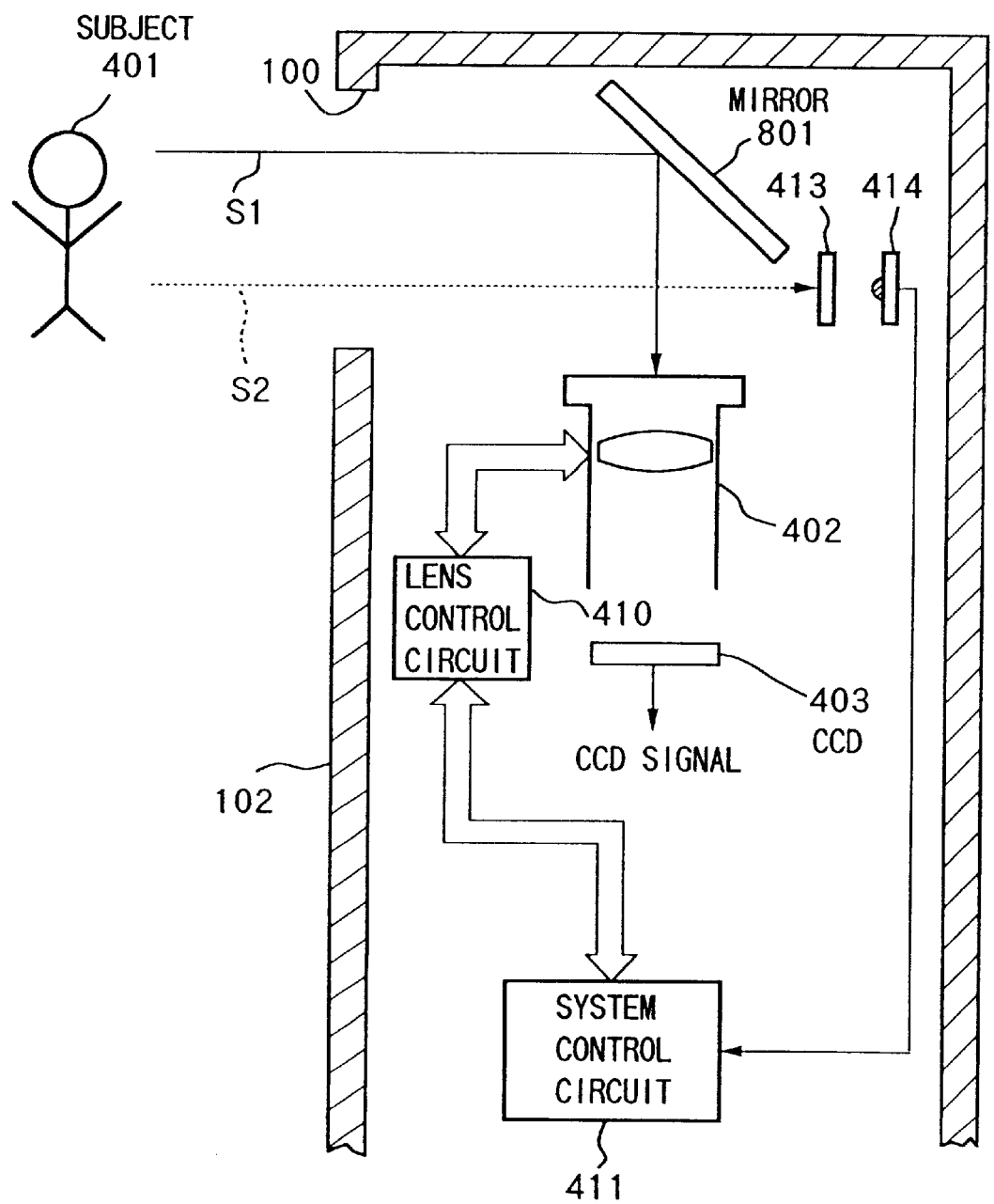
FIG. 4 is a diagram illustrating the internal structure of an image sensing apparatus according to a third embodiment.

Since provisions for a lens barrel 402 of some length must be made, a mirror 801 for reflecting solely the sensed light S1 is provided, as shown in FIG. 4. On the other hand, since the remote-control light-receiving window 413 and remote-control light-receiving element 414 are not that long, it may be so arranged that the remote-control signal light S2 impinges upon the remote-control light-receiving window 413 directly without being bent.

Further, in the embodiments described above, an example in which the optic axis of the incident light is bent by 90° is illustrated. However, the bending angle need not necessarily be 90°.

(Fourth Embodiment)

A fourth embodiment of an image sensing apparatus according to the present invention will now be described with reference to the drawings.

Figure 5:
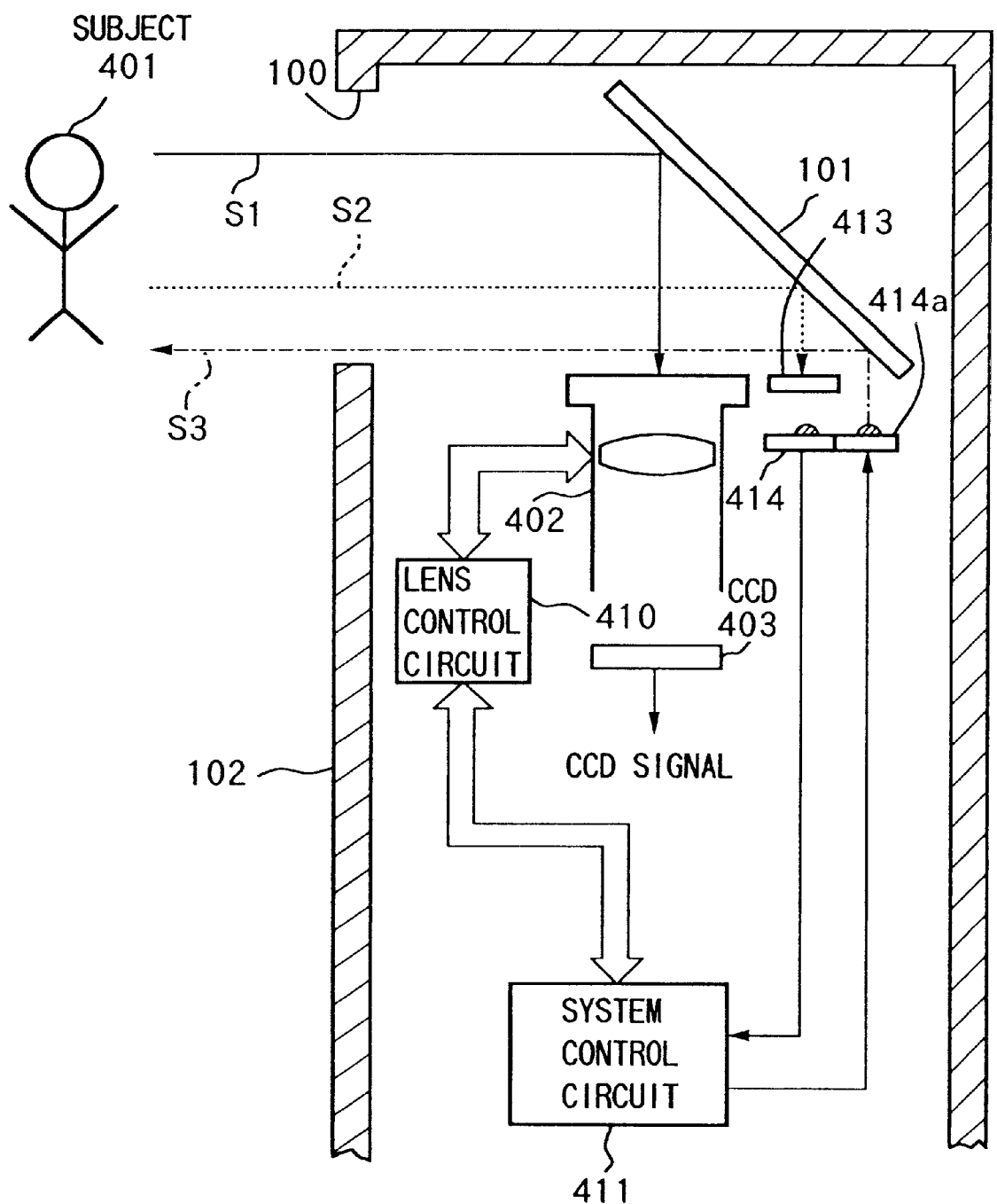
FIG. 5 is a diagram illustrating an example of an image sensing optical system and peripheral components in an image sensing apparatus according to a fourth embodiment.

FIG. 5 is a diagram illustrating an example of an image sensing optical system and peripheral components in an image sensing apparatus according to the fourth embodiment. Blocks having functions identical with those shown in the image sensing apparatus of FIG. 2 are designated by like reference numerals and need not be described in detail again.

In this embodiment as shown in FIG. 5, the sensed light S1 from the subject 401 is introduced into the interior of the case 102. In addition, remote-control signal light S3 (for remotely controlling an external apparatus such as a stationary VTR or personal computer), which is signal light that has been modulated, is led to the exterior of the case 102 via the opening 100 using the same optical path as that of the sensed light S1. Communication with the external apparatus by using infrared modulation method is in conformity with well-known IrDA or the like, and need not be described in detail here.

More specifically, the sensed light S1 from the subject 401 is reflected by the mirror 101, whereby the optic axis of the light is bent by approximately 90° to introduce the light to the image sensing lens 402. The sensed light S1 introduced to the image sensing lens 402 is subjected to a photoelectric conversion, a variety of signal processing and processing such as an electromagnetic conversion, in a manner similar to that described in conjunction with FIG. 2, before being recorded on tape (not shown).

In this embodiment, the remote-control signal light S3 is emitted by a light-emitting element 414a. The remote-control signal light S3 has its optic axis bent approximately 90° by the mirror 101 so that the light is led to the exterior of the case 101 via the opening 100. The light-emitting element 414a has its light-emitting operation controlled by the system control circuit 411 in the same manner as the remote-control light-receiving element 414.

In this embodiment, as described above, the arrangement is such that the optic axes of the sensed light S1 from the subject and of the remote-control signal light S3 are bent by 90° using the mirror 101 provided in order to make the image sensing apparatus more compact. As a result, it is possible to provide the apparatus with a remote-control function while maintaining compactness by so arranging it that the remote-control light-receiving window and the light-emitting window for emitting the modulated signal light need not be formed on the surface of the case 102.

(Fifth Embodiment)

Figure 6:
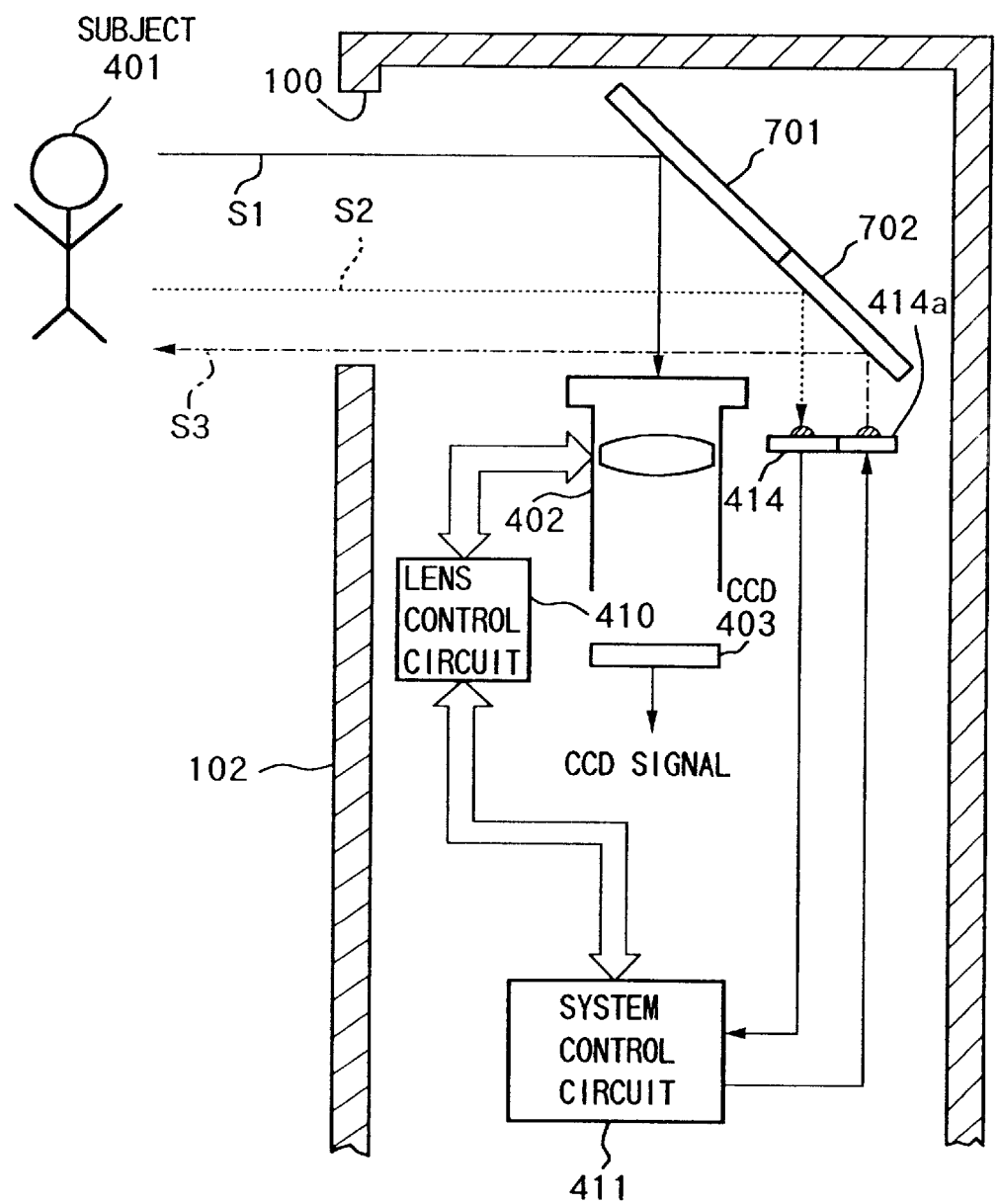
FIG. 6 is a diagram illustrating an example of an image sensing optical system and peripheral components in an image sensing apparatus according to a fifth embodiment.

FIG. 6 is a diagram illustrating an example of an image sensing optical system and peripheral components in an image sensing apparatus according to a fifth embodiment. Blocks having functions identical with those shown in the image sensing apparatus of FIG. 2 are designated by like reference numerals and need not be described in detail again.

In the case of this embodiment, the sensed light S1 from the subject 401 has its optical path bent by the mirror 701 so that the light is introduced to the image sensing lens 402. The dichroic mirror 702 which reflects light rays only in the infrared region is provided alongside the mirror 701 at a position offset from the optical path of the sensed light S1 from the subject captured by the image sensing lens 402. The remote-control signal light S3, which has been reflected by the dichroic mirror 702, is led to the opening 100.

In this arrangement, adopting a suitable infrared reflection characteristic for the dichroic mirror 702 makes it unnecessary to provide an optical filter for suppressing the emission of unnecessary frequencies included in the remote-control signal light S3. This contributes to greater compactness. Though the mirror 701 and dichroic mirror 702 are placed on the same plane in this case, they need not necessary be placed on the same plane.

(Sixth Embodiment)

In the fourth and fifth embodiments described above, the length of the image sensing apparatus in the direction of the subject is shortened by so arranging that the optical paths of the sensed light S1 from the subject and of the remote-control signal light S3 in the case 102 are bent by the bending means. However, even if the bending means such as the mirror 101 or the mirror 701 and dichroic mirror 702 is not provided, it can be so arranged that a remote-control light-receiving window and a window for emitting control signal light need not be provided on the surface of the case 102.

Figure 7:
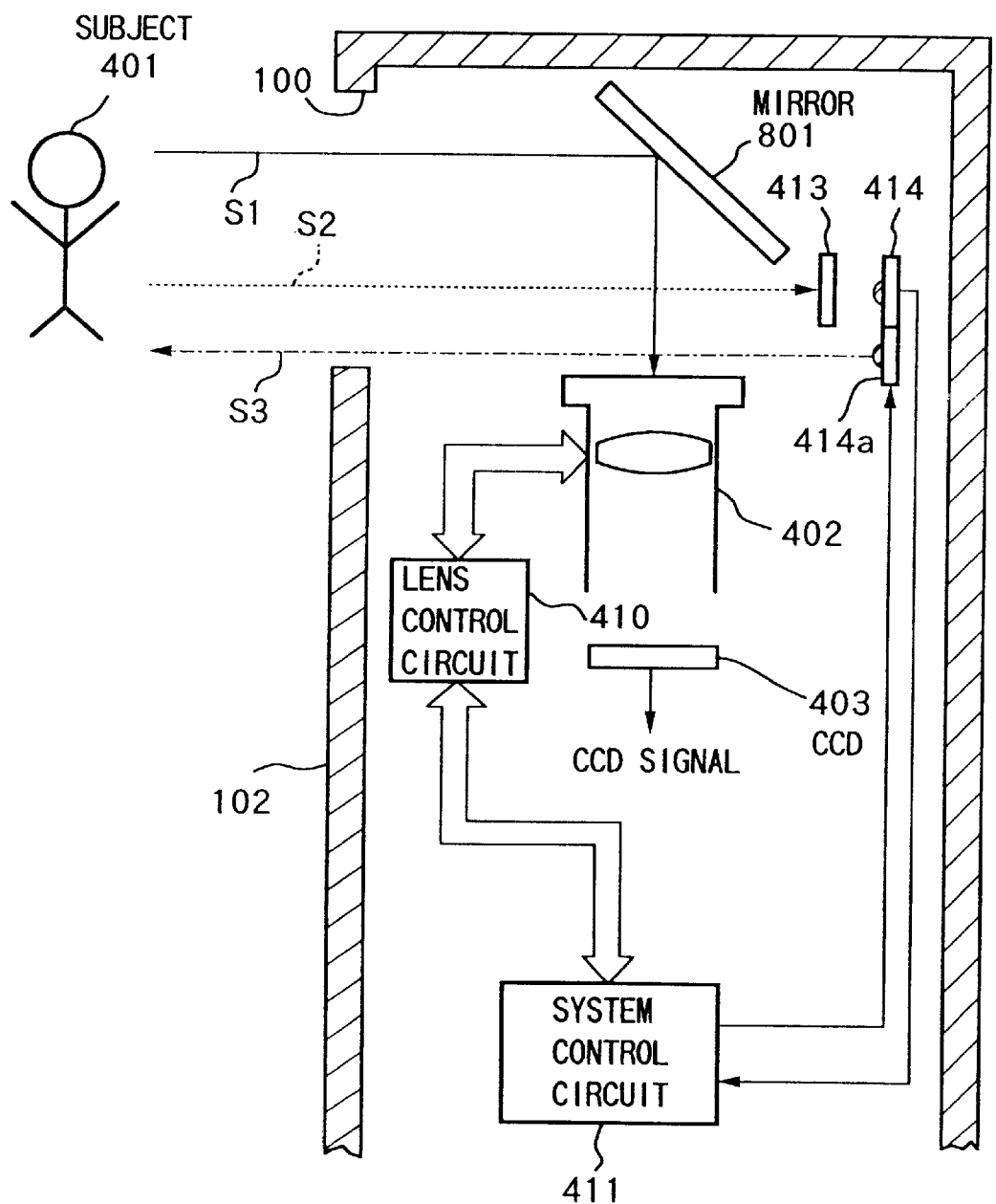
FIG. 7 is a diagram illustrating an example of an image sensing optical system and peripheral components in an image sensing apparatus according to a sixth embodiment.

Since provisions for a lens barrel 402 of some length must be made, the mirror 801 for reflecting solely the sensed light S1 is provided, as shown in FIG. 7. On the other hand, since the remote-control light-receiving element 414 and remote-control light-emitting element 414a require only a small amount of space for installation, it may be so arranged that the remote-control signal light ray S2 and remote-control signal light ray S3 are emitted (received) directly from the light-emitting portion (light-receiving portion) via the opening without being bent.

Further, in the embodiments described above, an example in which the optic axes of the incident light and emitted light are bent by 90° is illustrated. However, the angle through which the optic axes are bent by the bending means angle need not necessarily be 90°.

(Seventh Embodiment)

Figure 8:
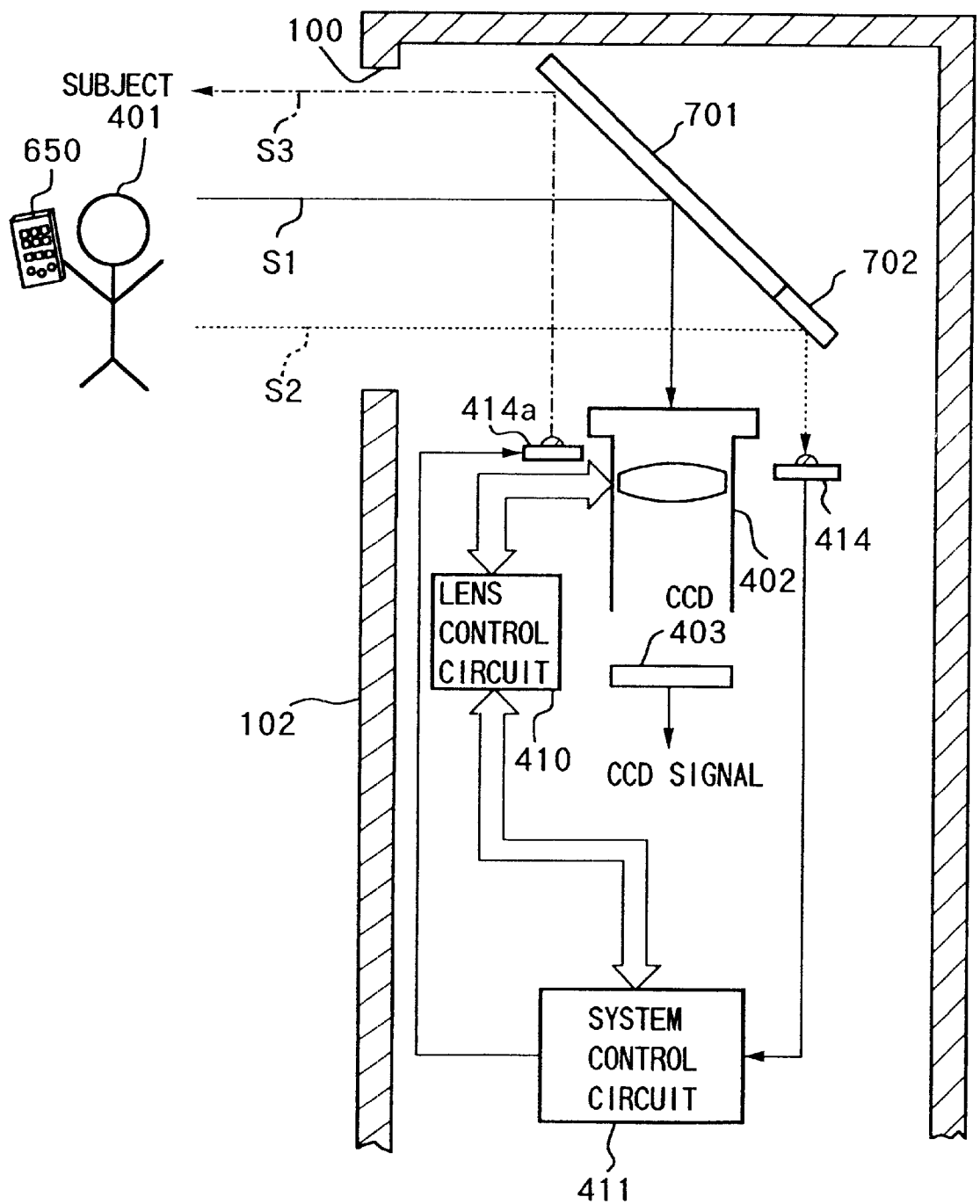
FIG. 8 is a diagram illustrating an example of an image sensing optical system and peripheral components in an image sensing apparatus according to a seventh embodiment.

In the embodiments shown in FIGS. 5 through 7, examples are illustrated in which a unit having the light-emitting element 414a disposed alongside the light-receiving element 414 is provided. However, the light-receiving element 414 and light-emitting element 414a need not necessary be provided side by side. For example, these two elements may be disposed at positions spaced apart from each other, as shown in FIG. 8. Further, the light-receiving element 414 may be dispensed with and only the light-emitting element 414a provided.

It should be noted that the light-receiving element 414 and light-emitting element 414a or the unit constituted by these elements in the foregoing embodiments can be fixed to lens barrel made of a molded resin to facilitate their positioning with respect to the reflector.

(Eighth Embodiment)

Figure 9:
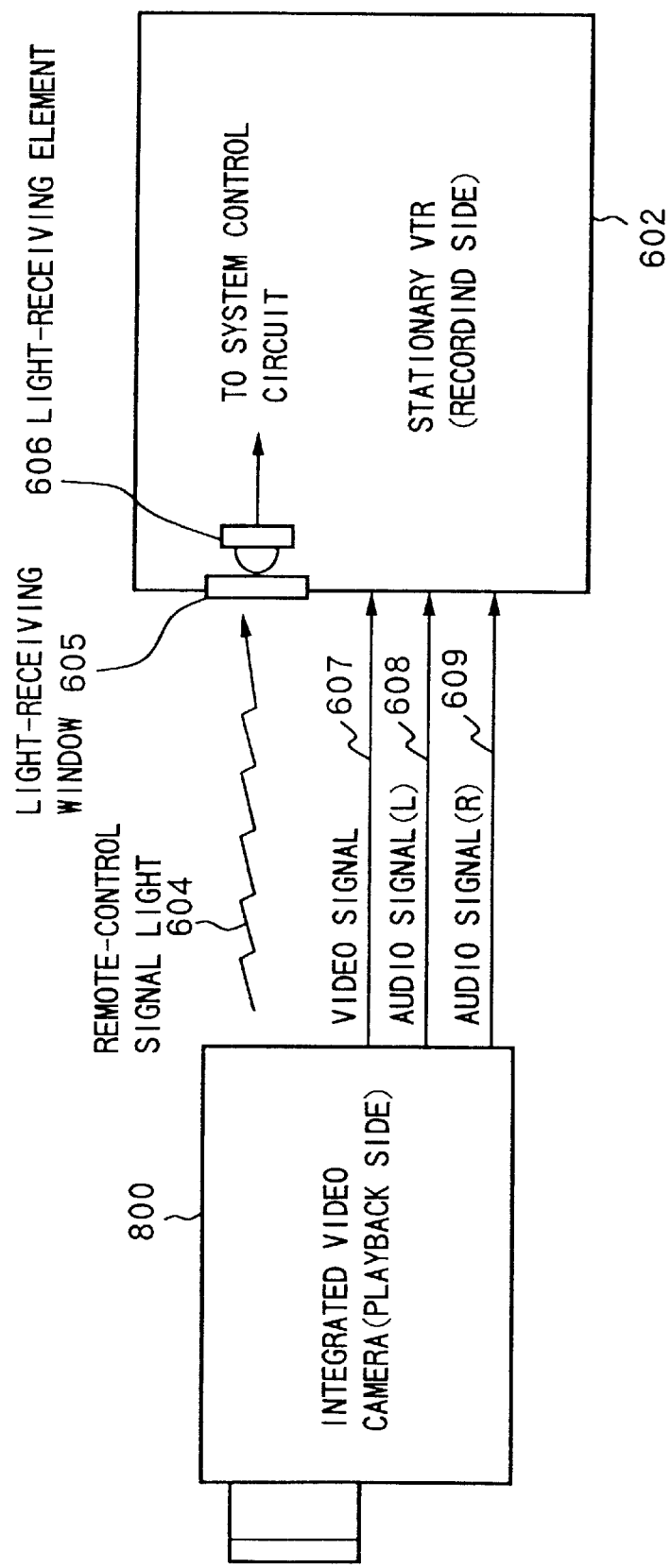
FIG. 9 is a diagram illustrating an example of a video editing system according to an eighth embodiment.

An image sensing apparatus adapted so as to transmit the remote-control signal in the manner set forth above is capable of constructing a video editing system by being connected to an external apparatus as shown in FIG. 9.

More specifically, as shown in FIG. 9, the video editing system is obtained by connecting a video signal output line 607, an L-channel audio signal output line 608 and an R-channel audio signal output line 609 to an integrated video camera 800 serving as an apparatus for playing back sensed video.

The three output lines 607, 608 and 609 of the video camera are connected to a stationary VTR 602 serving as a recording apparatus. A light-emitting element (not shown) provided inside the video camera 800 emits remote-control signal light 604, which is a designating signal conforming to the VTR 602.

The editing system of this embodiment thus constructed operates in the following manner.

(1) The operator operates the key unit or remote controller of the video camera 800 to select segments to be dubbed and segments that are unnecessary on a loaded recording tape (not shown) on which video has been recorded.

It should be noted that, in the key unit and the remote controller according to the embodiments, a selecting key for selecting either camera mode or VTR mode, a designating key for designating a start position of a segment to be dubbed, and a designating key for designating a termination position of a segment to be dubbed are provided. In addition, a recording start key, a stop key, a playing key, a playing stop key, a FFW key, a FRW key are also provided in the key unit and remote controller.

(2) The video camera 800 usually plays back only the segments selected by the operator and fast-forwards or rewinds segments that are not required. At playback from the video camera, the stationary VTR 602 usually is placed in the recording state. At fast-forward or rewind, the light-emitting element of the camera emits the remote-control signal 604 to place the stationary VTR 602 in a temporarily stopped state.

(3) By virtue of the function described above, the video camera 800 is capable of recording its playback signal on the VTR 602 only when it is performing ordinary playback. Hence an essentially edited signal is recorded on the tape loaded in the VTR 602.

Figure 15:
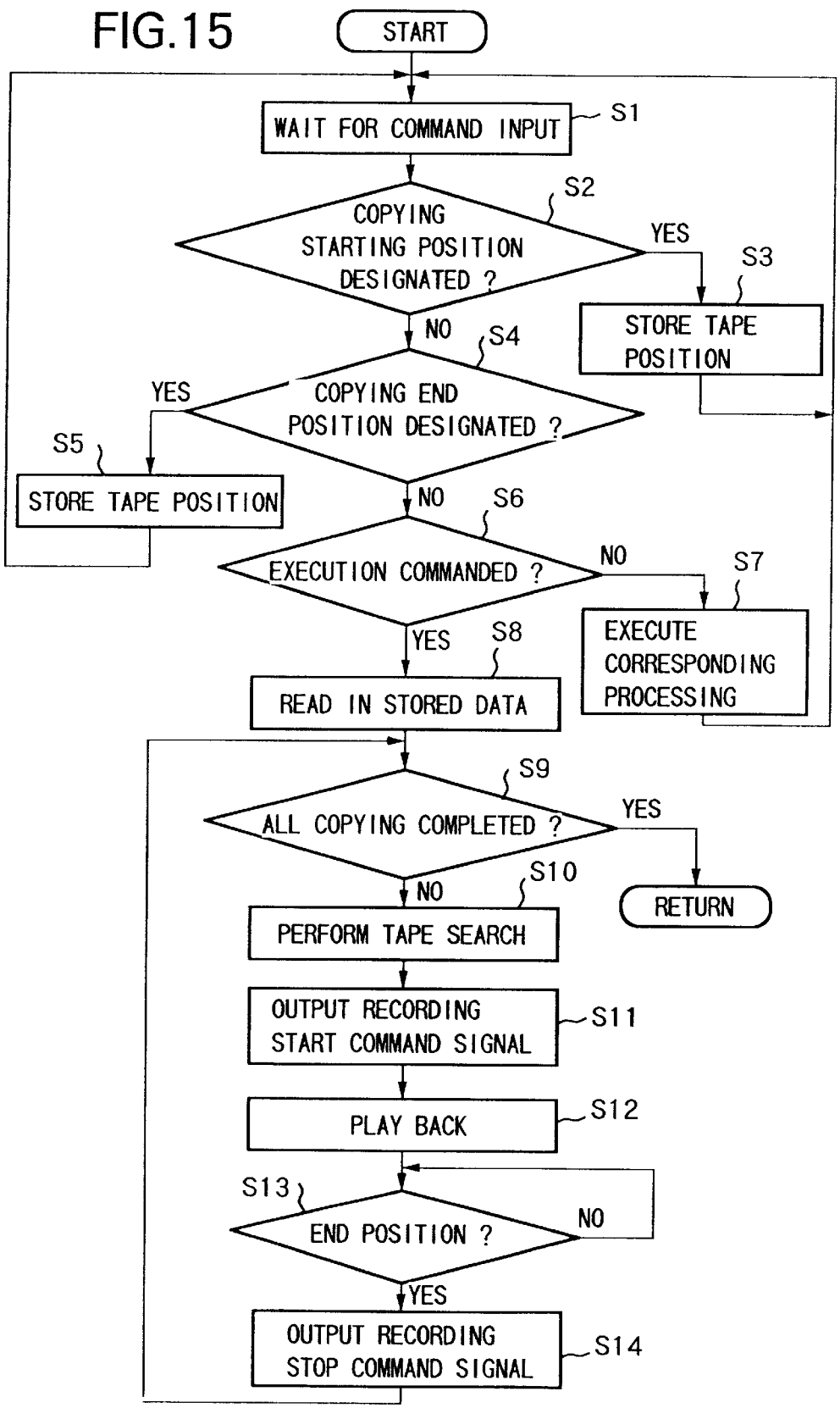
FIG. 15 is a flowchart illustrating the processing procedure of operation according to the eighth embodiment.

In order to implement the foregoing processing, it will suffice for the system controller 411 to execute processing in accordance with the flowchart of FIG. 15. The illustrated processing is executed when the key unit or a dubbing key provided on the remote controller is operated.

The system waits for a command from the key unit or from the remote controller at step S1. When a command has been entered, it is determined at step S2 whether the command is for designating a copying starting position. If the answer is "YES", the program proceeds to step S3 and the position of the video tape is recorded in a memory, which is not shown. Since an apparatus of this kind generally is equipped with counting means for determining the position of the video tape, in this embodiment the value from the counter is stored.

If the entered command is for designating a copying end position ("YES" at step S4), then the program proceeds from step S4 to step S5 and this tape position is stored. If it is determined that the entered command is other than an execution command ("NO" at step S6), then the program proceeds to step S7, where the corresponding processing is executed. Examples of commands other than an execution command are a fast-forward command, a fast-rewind command, etc.

By repeating the above-described operation, at least a pair of positions, namely a copying starting position and a copying end position, are recorded. The setting of the copying starting and end positions is carried out while performing fast-forward or fast-rewind and verifying the video which is being displayed on a well-known CCD device (not shown) provided on the back of the camera body or in the camera viewfinder.

When an execution command has been entered ("YES" at step S6), the program proceeds from step S6 to step S8.

Information indicating the copying starting and end positions described above is read out of the memory at step S8. Then, at step S9, it is determined whether all copying has been completed. If the answer is "NO", the program proceeds to step S10.

At step S10 the tape is fast-forwarded or rewound up to the copying starting position included in the pair of data items contained in the information that has been read out. The program then proceeds to step S11, at which a signal indicating a recording start command is sent from the light-emitting element 414*a* to the VTR 602. The playback operation of the apparatus 800 is started at step S800. Since the VTR 602 generally has a remote controller of its own, an infrared signal (here the recording start command signal) of a type exactly the same as that of this remote controller would be transmitted to the VTR 602.

As a result of the foregoing, reproduced video (inclusive of audio) in the video camera 800 can be recorded on the VTR.

If it is determined at step S13 that the end position has been reached during the playback operation, the program proceeds to step S14. Here the light-emitting element 414*a* issues a recording stop command signal to the VTR 602, after which the program returns to step S9.

By repeating the foregoing processing, it is possible for the user to have the VTR record a plurality of desired segments contained in the video captured by the video camera 800. No operation whatsoever is required of the operator on the side of the VTR 602. And since the starting and stopping of recording is performed automatically, continuous video is recorded on the VTR.

(Ninth Embodiment)

A ninth embodiment will be described with reference to FIG. 10.

The mode of use of the modulated signal light is not limited to a control-related signal such as the remote-control signal light S2 or remote-control signal light S3. For example, if a comparatively large transmission capacity is utilized to transmit e.g. a video signal and an audio signal or data such as date, title and track number, etc., wireless video editing can be performed without connecting the apparatus on the playback side and the apparatus on the recording side via the audio signal transmission lines 608, 609 and video signal transmission line 607 shown in FIG. 9.

Figure 10:
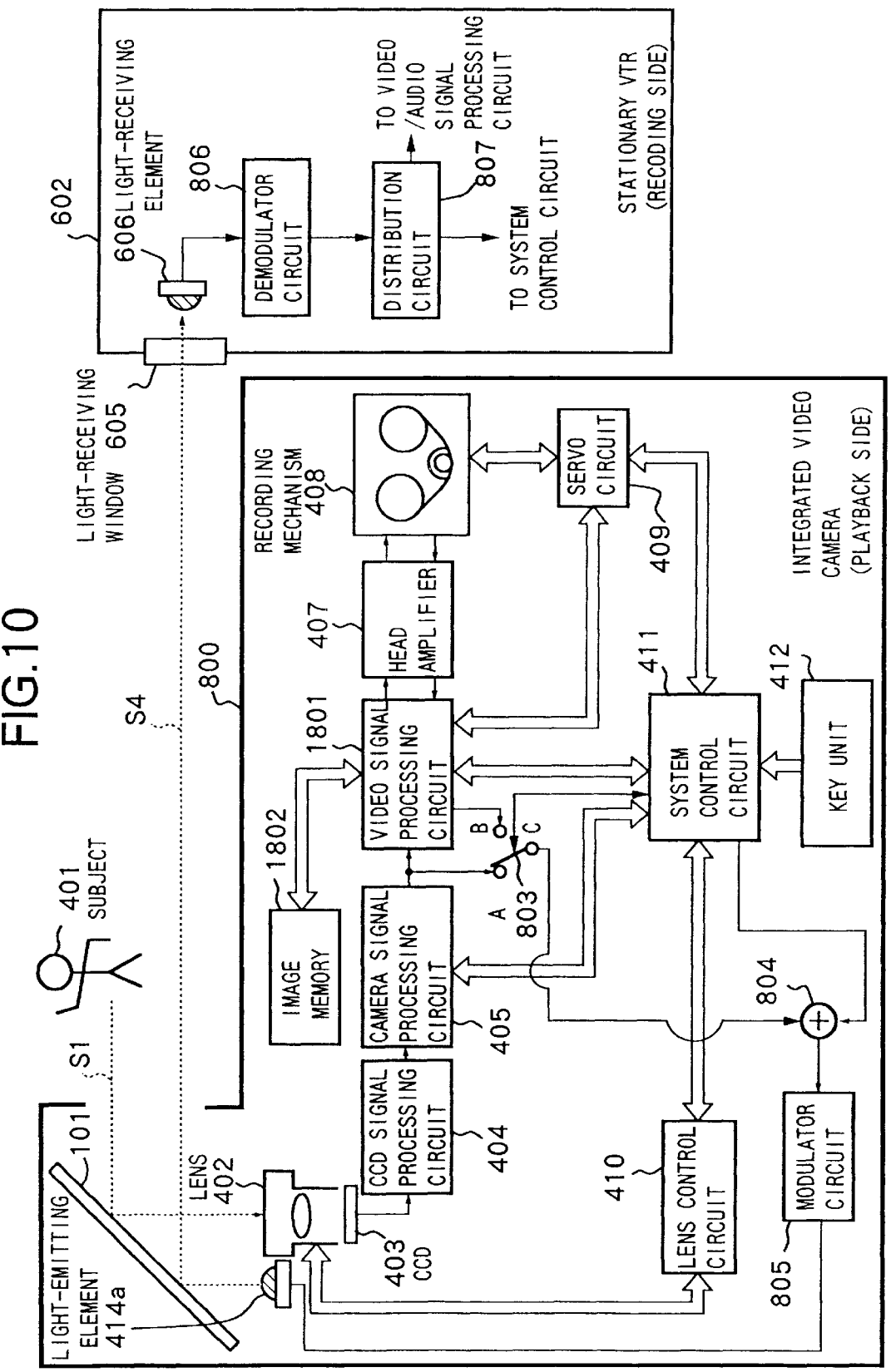
FIG. 10 is a diagram illustrating an example of an image sensing optical system and peripheral components in an image sensing apparatus according to a ninth embodiment.

FIG. 10 is a diagram illustrating an example of an image sensing optical system and peripheral components in a ninth embodiment. Blocks having functions identical with those described in the foregoing embodiments are designated by like reference numerals.

In a manner similar to that described in the foregoing embodiments, the sensed light S1 from the subject 401 is introduced to the image sensing lens 402 by having its optical path bent by the mirror 101. After the light is converted to an electric signal by the CCD 403, the signal is recorded on the recording tape by the recording mechanism 408.

The video camera 800 shown in FIG. 10 is equipped with an image memory 1802. When a switch (not shown) in the key unit 412, for example, is operated, the system control circuit 411 transmits an instruction via a video signal processing circuit 1801. Video prevailing at the moment the switch is operated can be captured as a still picture in the image memory 1802 from the moving video provided by the camera signal processing circuit 405. Further, a playback RF signal reproduced by the recording mechanism 408 can be demodulated to a video signal by the video signal processing circuit 1801, and video prevailing at the moment the above-mentioned switch is operated can be captured as a still picture in the image memory 1802 from the moving video that has been demodulated.

The still picture captured in the image memory 1802 as set forth above is output to a terminal B of a switch 803 via the video signal processing circuit 1801 in accordance with the instruction from the system control circuit 411. At this time the switch 803 is connected to the side of terminal B by the system control circuit 411, whereby the still-picture output signal of the image memory 1802 is introduced to a combining circuit 804.

The combining circuit 804 combines the remote-control signal output by the system control circuit 411 and the still-picture output signal from the image memory 802 and outputs the combined signal to a modulator circuit 805.

The modulator circuit 805 modulates the combined signal from the combining circuit 804 for the purpose of producing signal light whose format is in conformity with the stationary VTR 602. The modulated signal is output to the light-emitting element 414*a*.

Modulated signal light S4 emitted by the light-emitting element 414*a* includes both image information and remote-control information. The optical path of this signal light is bent by the mirror 101 so that the light is emitted toward the VTR 602. The light enters the interior of the VTR via a light-receiving window 605 of the stationary VTR and is received by a light-receiving element 606.

The signal light received by the light-receiving element 606 is photoelectrically converted to an electric signal. The electric signal output by the light-receiving element 606 is introduced to a demodulator circuit 806, whereby the signal is demodulated. The demodulated signal is then applied to a distribution circuit 807, which distributes the signal as a video signal and a remote-control signal. The video signal is introduced to a video signal processing circuit and the remote-control signal to a system control circuit.

If the switch 803 is made to contact the side of terminal A by an instruction from system control circuit 411, the video currently being captured and applied to the camera signal processing circuit 405 via the lens 402 can be transmitted to the stationary VTR 602.

Further, by connecting switch 803 to terminal B in accordance with a command from the system control circuit 411 and controlling the video signal processing circuit 1801, a moving picture currently being played back by the image recording mechanism 408 can be transmitted to the stationary VTR 602. Furthermore, by additionally providing the video signal processing circuit 1801 with an audio signal processing function, it is possible to transmit not only video information but also audio information.

In the description of the foregoing embodiments, the video camera is adopted as the transmitting side and the VTR as the receiving side. However, the relationship can be reversed, with the video camera performing recording on the receiving side. Further, video cameras can be used as both the transmitting and receiving sides. In such case each video camera would be provided with the demodulating circuit and distribution circuit shown in the VTR illustrated in FIG. 10.

In accordance with the first through ninth embodiments, remote-control signal light is introduced into a case of an image sensing apparatus and is then received by a remote-control light-receiving element. This makes it possible to introduce the remote-control signal light into the interior of the case along an optical path the same as that of the sensed light from the subject. The remote-control function can be realized without providing the surface of the case with a light-receiving window for receiving the remote-control signal light. As a result, the construction of the case of the image sensing apparatus can be simplified and both the design and fabrication of the case can be facilitated.

Further, the optical path bending means is provided for bending the optical paths of the sensed light ray from the subject and of the remote-control signal light ray introduced to the interior of the case through the opening, and the sensed light ray from the subject and remote-control signal light ray are received after being bent by the optical path bending means. As a result, the length of the image sensing apparatus in the direction of the subject can be reduced greatly so that it is possible to realize a highly compact image sensing apparatus.

Since the optical bending means selectively reflects light of a specific wavelength corresponding to the wavelength of the remote-control signal light, it can be so arranged that it is unnecessary to provide a remote-control light-receiving window adapted to selectively transmit the light of the specific wavelength in front of the remote-control light-receiving element.

Further, it is so arranged that modulated signal light is emitted from a light-emitting element inside the case. This makes it possible to emit this signal light from the interior of the case along an optical path the same as that of the sensed light from the subject. It is possible to achieve an emission of modulated signal light to the exterior of the case without providing the surface of the case with a light-emitting portion for emitting this signal light. As a result, the construction of the case of the image sensing apparatus can be simplified and both the design and fabrication of the case can be facilitated.

Further, the optical path bending means is provided for bending the optical paths of the sensed light ray from the subject and of the above-mentioned signal light ray introduced to the interior of the case through the opening, the sensed light from the subject is received after being bent by the optical path bending means, and the above-mentioned signal light emitted from within the case is projected to the exterior of the case after being bent by the optical bending means. As a result, the length of the image sensing apparatus in the direction of the subject can be reduced greatly so that it is possible to realize a highly compact image sensing apparatus.

Since the optical bending means selectively reflects light of a specific wavelength corresponding to the wavelength of the remote-control signal light, it can be so arranged that it is unnecessary to provide an optical filter adapted to selectively transmit the light of the specific wavelength in front of the light-emitting element.

Further, since remote-control signal light from the light-emitting element provided inside the case is led to the exterior of the case via an opening for introducing the sensed light from the subject into the interior of the case, a remote-control function can be realized without providing the surface of the case with a light-emitting window for leading the remote-control signal light to the exterior of the case. As a result, the construction of the case of the image sensing apparatus can be simplified and both the design and fabrication of the case can be facilitated.

Further, since remote-control signal light from the light-emitting element provided inside the case after being bent by the optical path bending means, a remote-control function for remotely controlling an external apparatus can be provided while reducing the length of the image sensing apparatus in the direction of the subject to obtain a more compact image sensing apparatus.

Further, the remote-control signal for remotely controlling the operation of the external apparatus, the audio signal and the video signal are combined and transmitted wirelessly. This makes it possible to construct a video editing system without connecting a video camera (the playback side) and an apparatus on the recording side by signal transmission lines.

In accordance with the present invention, therefore, the case of the image sensing apparatus can be simplified by reducing the number of parts provided on the surface of the apparatus without eliminating the remote-control function.

(Tenth Embodiment)

Each of the foregoing embodiments is based upon FIG. 13 and represents an improvement on FIG. 13. The embodiments from the tenth embodiment onward are described as examples of improvements over the arrangement of FIG. 14.

Figure 16:
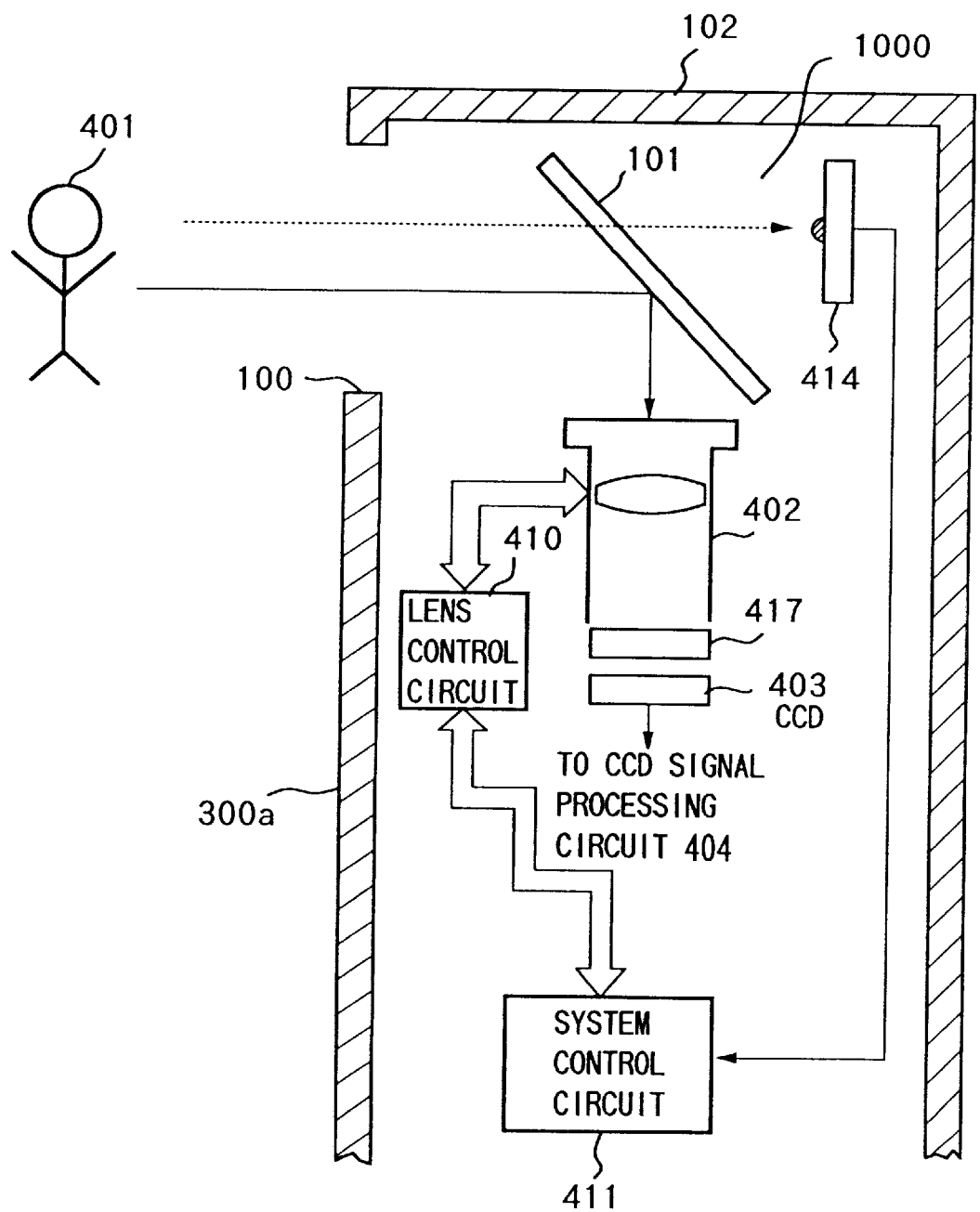
FIG. 16 is a structural view showing a tenth embodiment of the present invention.

FIG. 16 is a diagram illustrating an example of an image sensing optical system and peripheral components in an image sensing apparatus according to a tenth embodiment. Though the connections between blocks are in line with FIG. 14, some of the connections are not shown in FIG. 16 for the sake of simplicity. The external appearance of the apparatus 102 is as shown in FIG. 1.

Figure 14:
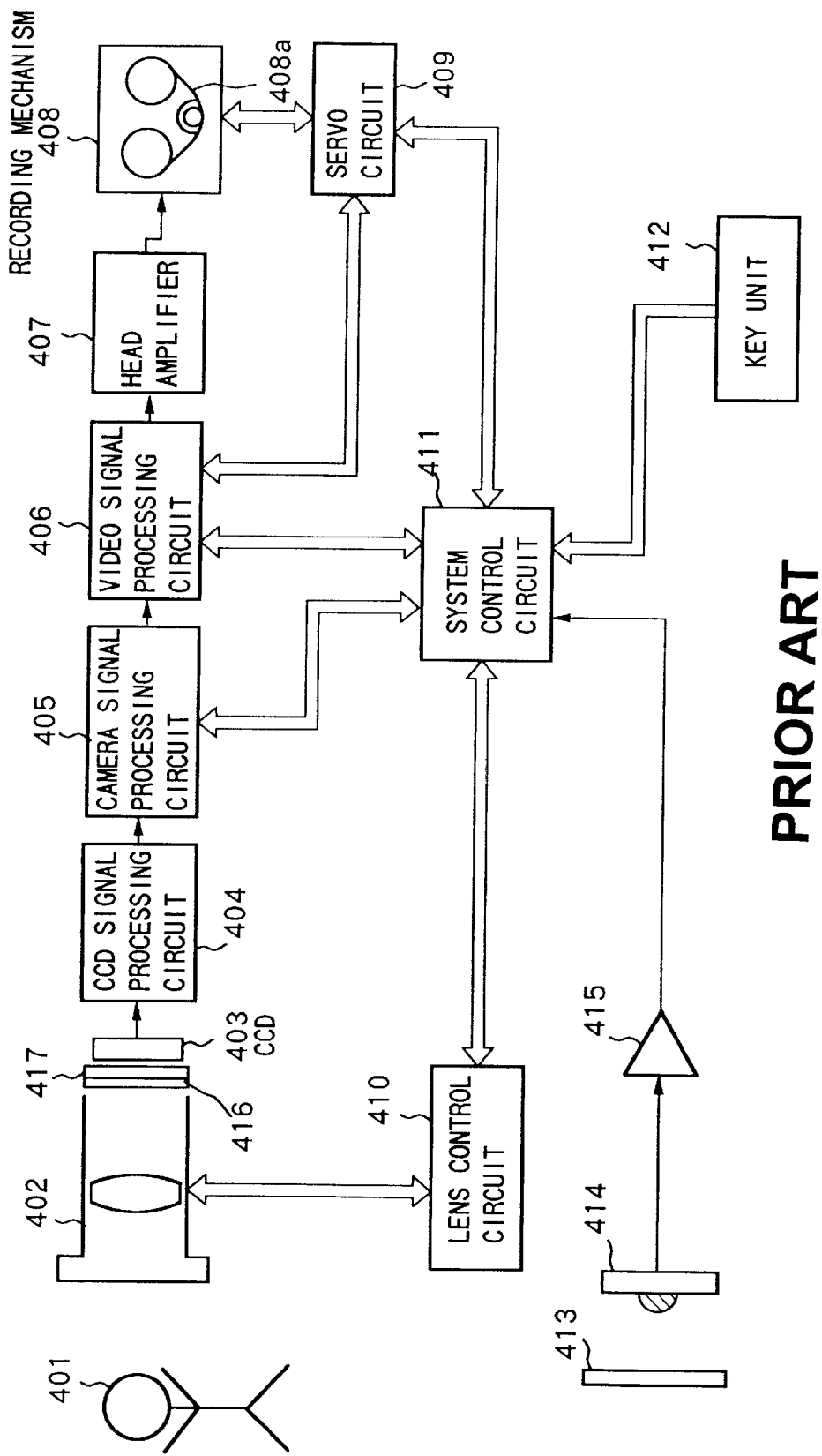
FIG. 14 is another block diagram of an integrated video camera having a remote-control function.

In this embodiment, as shown in FIG. 16, a dichroic mirror 101 which transmits infrared light and reflects visible light is provided, and a remote-control light-receiving element 414 is placed in an unused triangular space 1000 available in back of the dichroic mirror 101. The infrared cutting filter 416 in FIG. 14 is deleted.

The operation of this apparatus will now be described.

The image of the subject 401 that enters from the light-receiving window 100 is separated into visible light and infrared light by the dichroic mirror 101 which transmits infrared light and reflects visible light. The visible light is bent by approximately 90° by the dichroic mirror 101 so as to be introduced to the lens barrel 402. The visible light thus introduced to the lens barrel 402 is subjected to a photo-electric conversion, a variety of signal processing and processing such as an electromagnetic conversion, in a manner similar to that shown in FIG. 14, before being recorded on video tape 408a. Meanwhile, after being separated by the dichroic mirror 101, the infrared light advances through the mirror and is introduced to the remote-control light-receiving element 414. The output signal of the remote-control light-receiving element 414 also enters the system control circuit 411 in the same manner as shown in FIG. 14.

The property of the dichroic mirror 101 is such that the mirror transmits infrared light. By adjusting this transmission characteristic appropriately to satisfy the infrared transmission characteristic of the remote-control light-receiving window 413 of FIG. 14 provided in the conventional product, and by setting this characteristic to one which includes the infrared cutting characteristic of the infrared cutting filter 416, the dichroic mirror 101 essential in the product of FIG. 1 for bending the image of the subject can also be provided with the function of a remote-control light-receiving window for selectively transmitting infrared light, thus making it possible to dispense with the remote-control light-receiving window 413 and the infrared cutting filter 416.

It should be noted that if the dichroic mirror 101 is provided solely with an infrared cutting characteristic, only the infrared cutting filter 416 can be eliminated.

By placing the remote-control light-receiving element 414 in the unused triangular space 1000 available in back of the dichroic mirror 101, there is no increase in the size of the apparatus and it is no longer necessary to provide the remote-control light-receiving window 413 on the surface of the case 102. This makes it possible to incorporate a remote-control function while maintaining compactness and performance.

(11th Embodiment)

Figure 17:
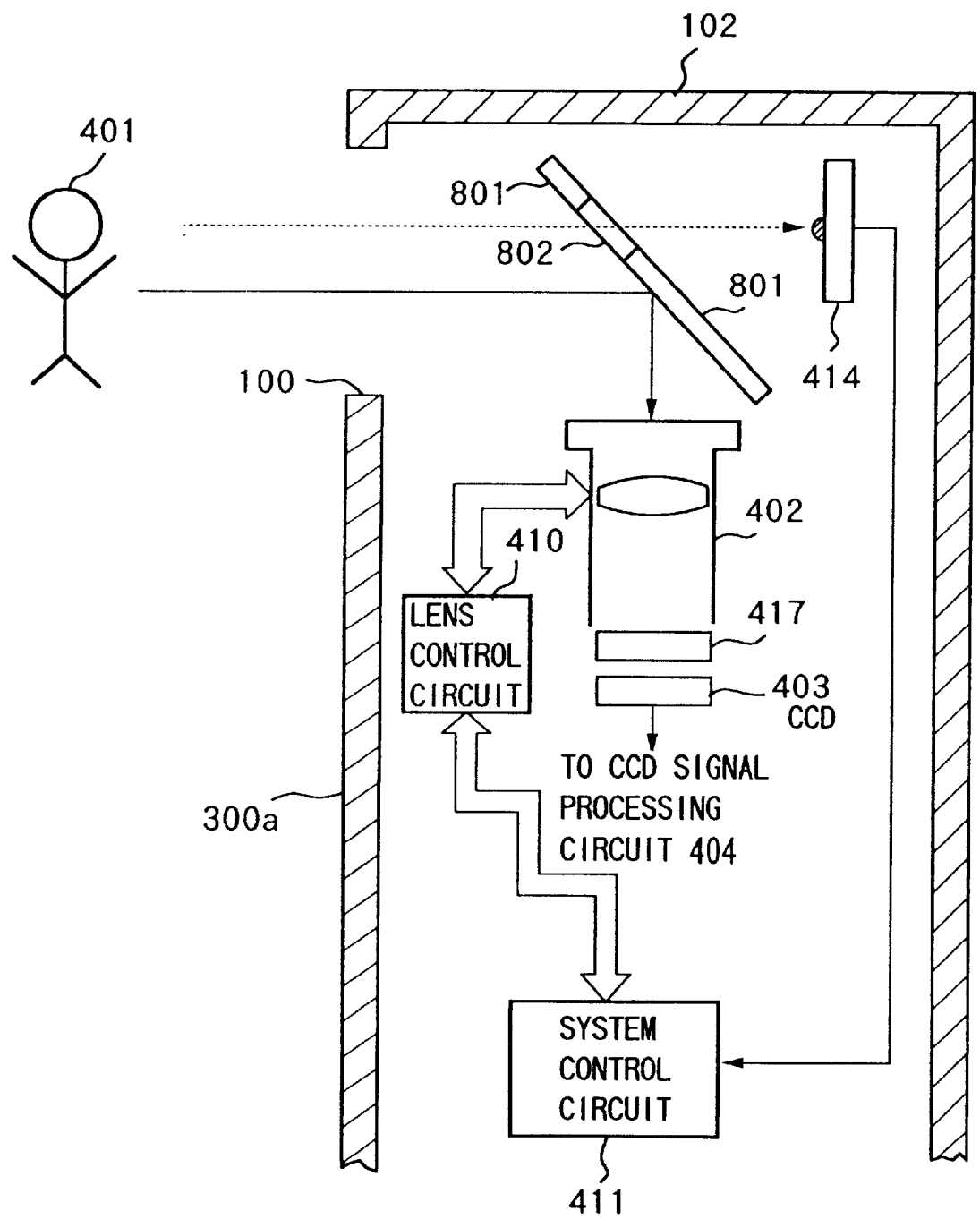
FIG. 17 is a structural view showing an 11th embodiment of the present invention.

FIG. 17 is a diagram illustrating an example of an image sensing optical system and peripheral components in an image sensing apparatus according to an 11th embodiment. According to this embodiment, a mirror 801 partially fitted with a dichroic mirror 802 is provided instead of the dichroic mirror 101 of the tenth embodiment. In addition, the infrared cutting filter 416 of FIG. 14 has been eliminated.

In terms of operation, the image of the subject has its optical path bent by the mirrors 801, 802 so as to be introduced to the lens barrel 402 in a manner similar to that of the tenth embodiment. A portion of the mirror 801 is constituted by the dichroic mirror 802 in order to transmit the incident light without bending it. The remote-control infrared light is introduced to the remote-control light-receiving element 414 via the dichroic mirror 802.

Accordingly, by providing the dichroic mirror 802 with a characteristic that combines the characteristic of the remote-control light-receiving window 413 and the characteristic of the infrared cutting filter 416 of FIG. 14, the remote-control light-receiving window 413 and infrared cutting filter 416 can be eliminated. By placing the remote-control light-receiving element 414 in the unused triangular space 1000 available in back of the mirrors 801, 802, a remote-control function can be incorporated while maintaining compactness and performance.

(12th Embodiment)

Figure 18:
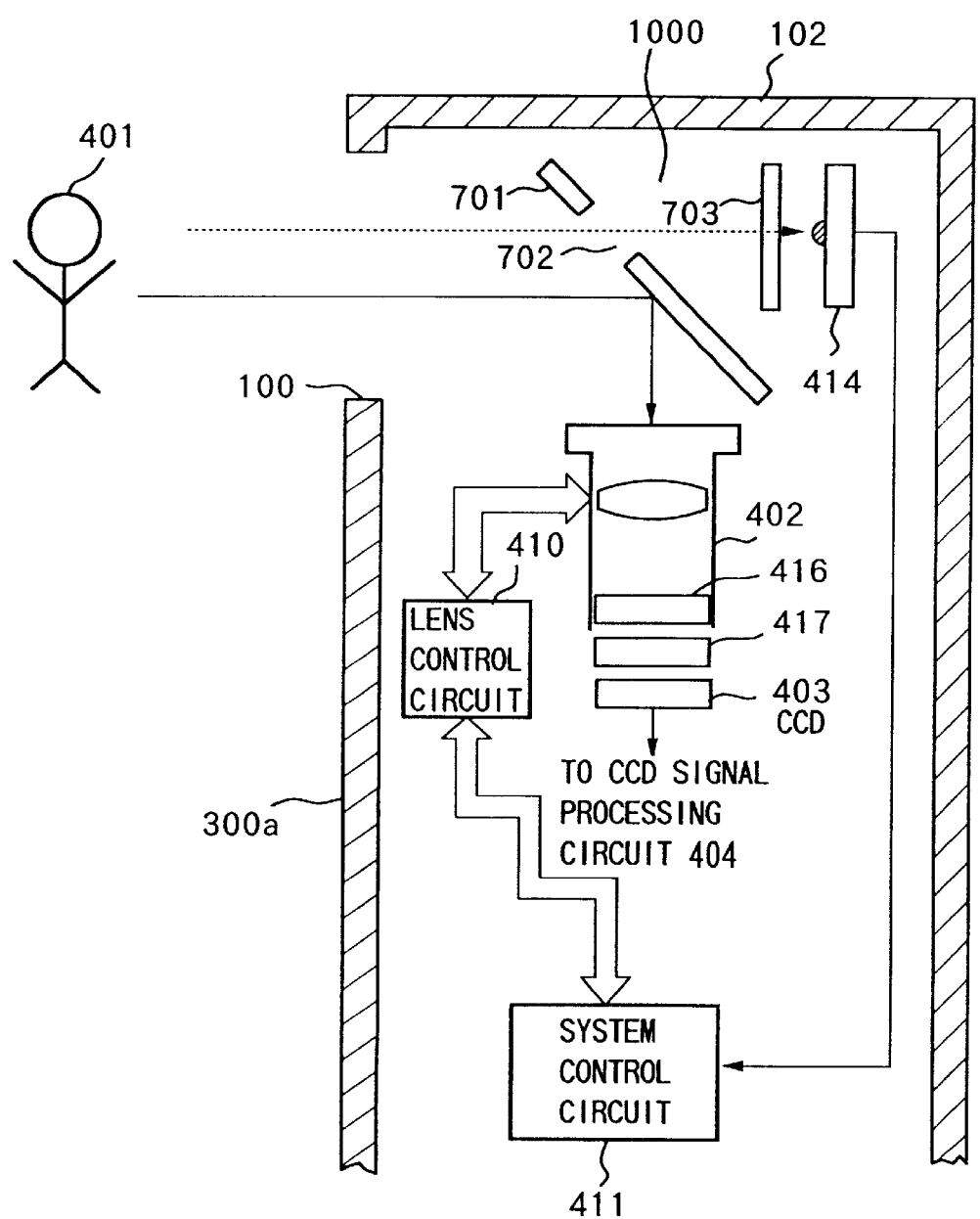
FIG. 18 is a structural view showing a 12th embodiment of the present invention.

FIG. 18 is a diagram illustrating an example of an image sensing optical system and peripheral components in an image sensing apparatus according to a 12th embodiment. According to this embodiment, a mirror 701 having a hole 702 is provided, and an infrared transmitting element 703 and the remote-control light-receiving element 414 are provided in back of the mirror 701. The infrared cutting filter 416 and the optical low-pass filter 417 are provided as well.

In terms of operation, the image of the subject has its optical path bent by the mirror 701 so as to be introduced to the lens barrel 402 in a manner similar to that of the tenth embodiment. The mirror 701 is provided with the hole 702 for transmitting the incident light without bending it. Signal light from the remote controller is introduced to the remote-control light-receiving element 414 via the hole 702 and the infrared transmitting element 703, which has an optical characteristic equivalent to that of the remote-control light-receiving window 413. By adopting a design in which the hole 702 is provided outwardly of the field angle of the lens barrel 402, the captured picture will not be affected by the hole 702 and a remote-control function can be incorporated while maintaining compactness.

According to this embodiment, the infrared transmitting element 703 is provided. However, since the element 703 is disposed together with the remote-control light-receiving element 414 in the unused triangular space 1000 available in back of the mirror 701, a reduction in the size of the apparatus can be achieved.

(13th Embodiment)

Figure 19:
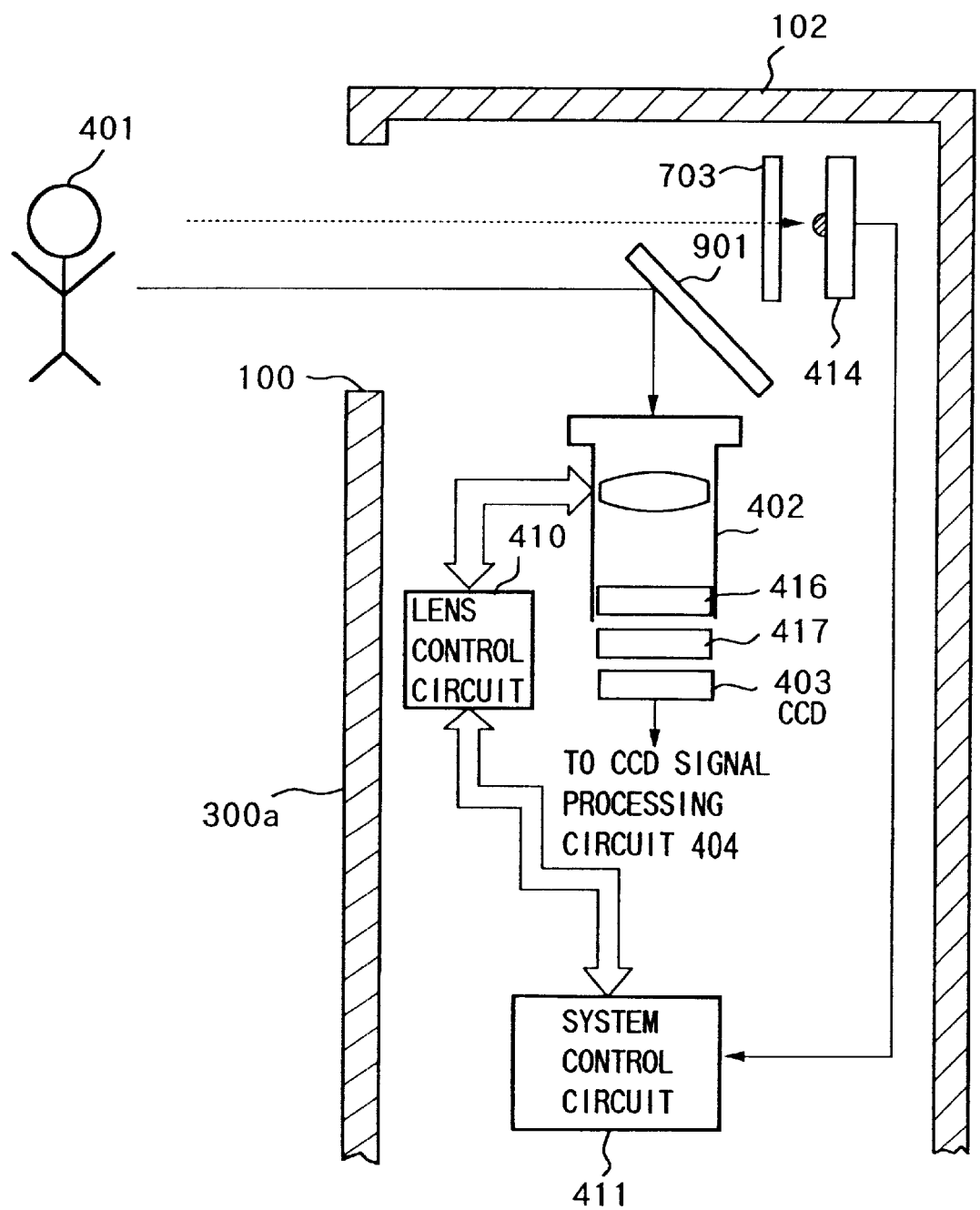
FIG. 19 is a structural view showing a 13th embodiment of the present invention.

FIG. 19 illustrates a 13th embodiment of the present invention. Here a mirror 901 is provided instead of the mirror 701 of FIG. 18 so as to allow the remote-control light to pass on its outer side.

According to this embodiment, the hole 702 is not provided, thus making it possible to achieve compactness through an even simpler arrangement.

(14th Embodiment)

In the 10th through 13th embodiments, a case is described in which processing is executed upon reception of a command signal from the remote controller. In the embodiments from the 14th onward, however, an example is described in which a camera apparatus according to the embodiments is connected to a stationary VTR apparatus and the VTR apparatus is controlled on the camera side. The connection relationship between the camera apparatus and the stationary VTR apparatus is similar to that shown in FIG. 9.

Figure 20:
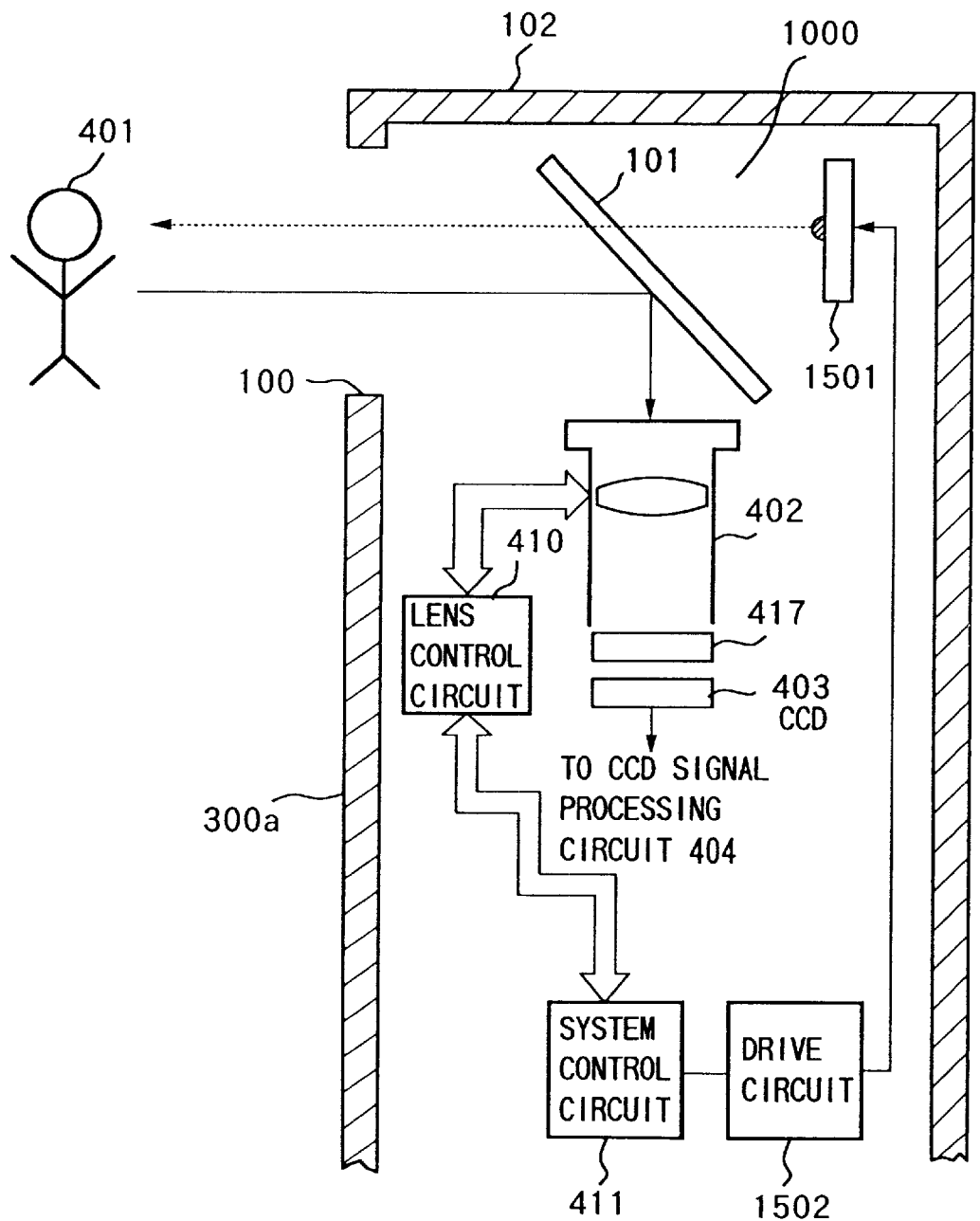
FIG. 20 is a structural view showing a 14th embodiment of the present invention.

FIG. 20 is a diagram illustrating an example of an image sensing optical system and peripheral components in an image sensing apparatus according to a 14th embodiment. Part of the apparatus is deleted from the drawing of FIG. 20 for the sake of simplicity.

In this embodiment, the dichroic mirror 101 which transmits infrared light and reflects visible light is provided, and a light-emitting element 1501 for emitting modulated signal light such as remote-control signal light is placed in the unused triangular space 1000 available in back of the dichroic mirror 101. By adopting this arrangement, the infrared cutting filter 416 in eliminated.

The operation of this apparatus will now be described.

The image of the subject 401 that enters from the window 100 through which light passes is separated into visible light and infrared light by the dichroic mirror 101 which transmits infrared light and reflects visible light. The visible light is bent by approximately 90° by the dichroic mirror 101 so as to be introduced to the lens barrel 402. The visible light thus introduced to the lens barrel 402 is subjected to a photoelectric conversion, a variety of signal processing and processing such as an electromagnetic conversion before being recorded on the video tape 408a. As mentioned above, the light-emitting element 1501 for emitting modulated infrared signal light is provided in back of the dichroic mirror 101. The infrared light output by the light-emitting element 1501 propagates through the dichroic mirror 101 and is emitted to the exterior of the case via the window 100 through which the light passes. The signal output by the light-emitting element 1501 is produced in the system control circuit 411 and arrives at the light-emitting element 1501 via a drive circuit 1502.

The property of the dichroic mirror 101 is such that the mirror transmits infrared light. By adjusting this transmission characteristic appropriately to sufficiently transmit modulated signal light such as remote-control signal light having the conventional frequency components, and by setting this characteristic to one which includes the infrared cutting characteristic of the infrared cutting filter 416 with respect to the subject image to be reflected, i.e. to a characteristic which will transmit the sensed image light and not reflect the unnecessary light in the infrared region, it is possible to realize a camera structure in which the infrared cutting filter 416 can be dispensed with while providing the dichroic mirror 101 essential in the product of FIG. 1 for bending the image of the subject with the function of a light-emitting window for selectively transmitting infrared light.

It should be noted that if the dichroic mirror 101 is provided solely with an infrared cutting characteristic, only the infrared cutting filter 416 can be eliminated.

By placing the light-emitting element 1501 for emitting modulated signal light in the unused triangular space available in back of the dichroic mirror 101, there is no increase in the size of the apparatus and it is no longer necessary to provide the a light-emitting window for the modulated signal light on the surface of the case 102. This makes it possible to incorporate a function for emitting modulated signal light such as remote-control signal light while maintaining compactness and performance.

(15th Embodiment)

Figure 21:
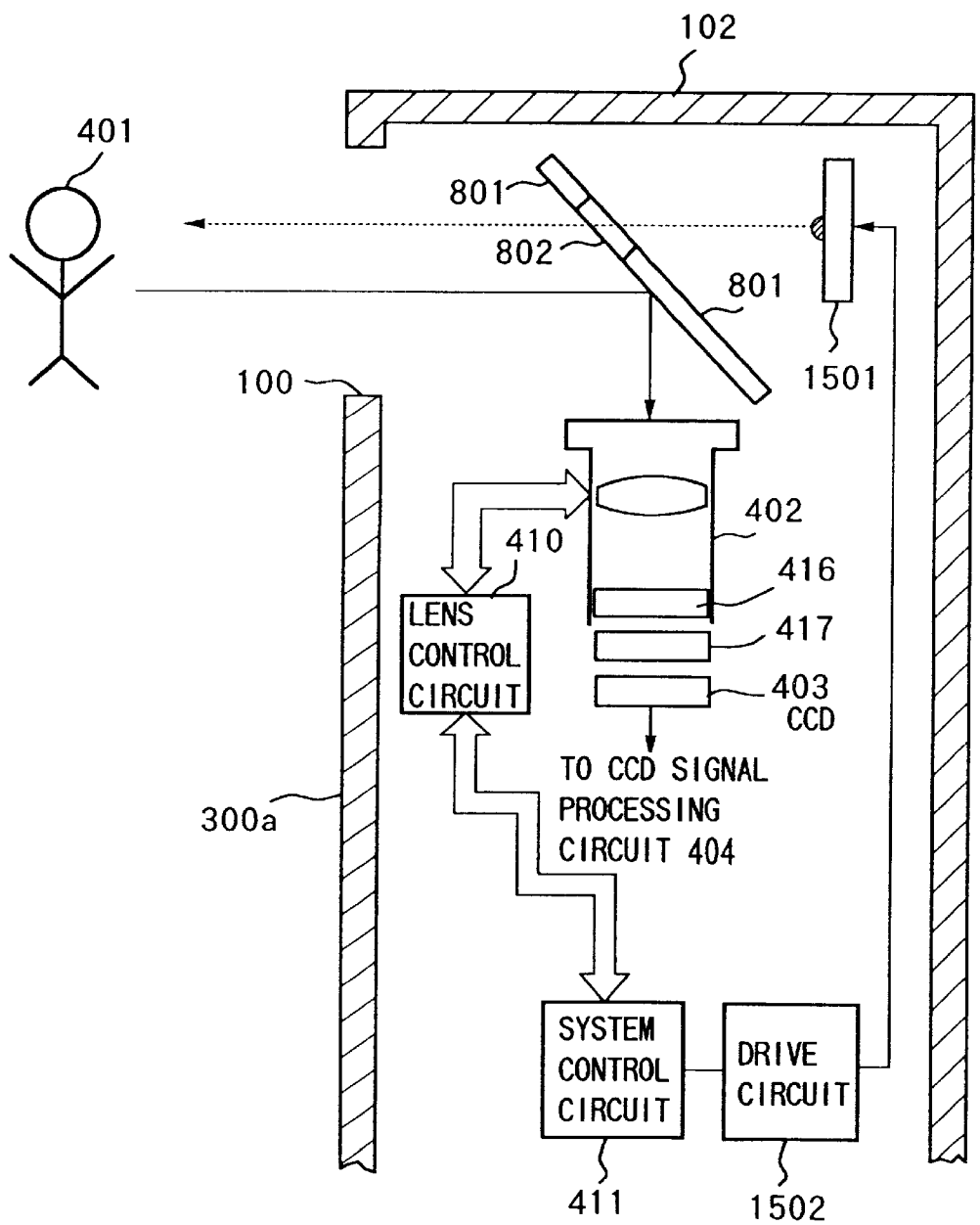
FIG. 21 is a structural view showing a 15th embodiment of the present invention.

FIG. 21 is a diagram illustrating an example of an image sensing optical system and peripheral components in an image sensing apparatus according to a 15th embodiment. According to this embodiment, the mirror 801 partially fitted with the dichroic mirror 802 is provided instead of the dichroic mirror 101 of the 14th embodiment. The infrared cutting filter 416 and the optical low-pass filter 417 are provided as well.

In terms of operation, the image of the subject has its optical path bent by the mirrors 801, 802 so as to be introduced to the lens barrel 402 in a manner similar to that of the 14th embodiment. A portion of the mirror 801 is constituted by the dichroic mirror 802 in order to transmit the incident light without bending it. The modulated remote-control infrared light output from the light-emitting element 1501 propagates through the dichroic mirror 802 and exits to the exterior of the case 102.

Accordingly, the sensed light from the subject is reflected by the mirror 801 and dichroic mirror 802 so as to be introduced to the lens barrel 402, and the infrared signal light from the light-emitting element 1501 propagates through the dichroic mirror 802 and is emitted to the exterior of the case 102 via the window 100 through which the light passes. By placing the light-emitting element 1501 in the unused triangular space available in back of the mirrors 801, 802, a function for emitting modulated signal light such as remote-control signal light can be incorporated while maintaining compactness and performance.

(16th Embodiment)

Figure 22:
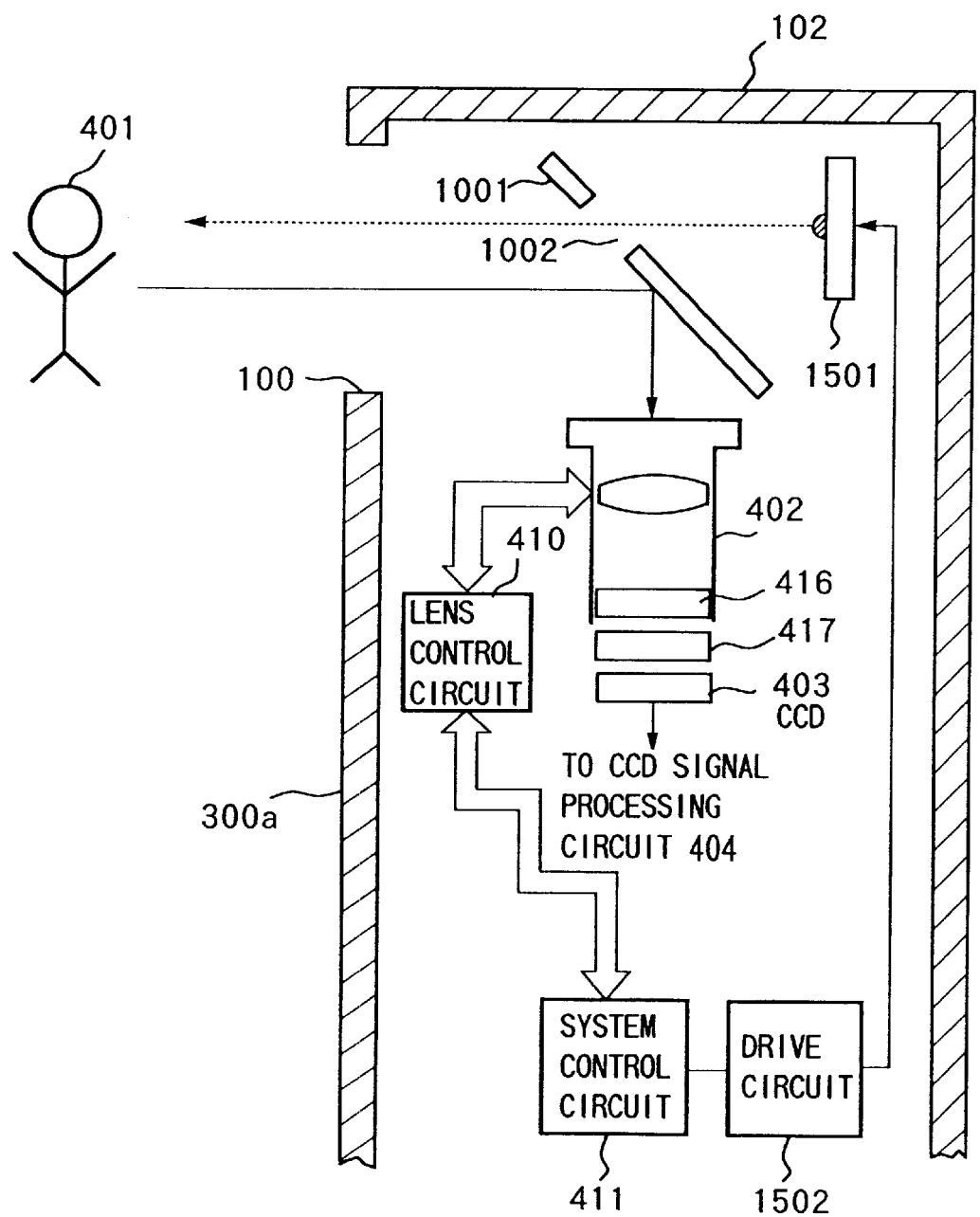
FIG. 22 is a structural view showing a 16th embodiment of the present invention.

FIG. 22 is a diagram illustrating an example of an image sensing optical system and peripheral components in an image sensing apparatus according to a 16th embodiment. According to this embodiment, a mirror 1001 having a hole 1002 is provided, and the light-emitting element 1501 is provided in back of the mirror 1001. The infrared cutting filter 416 and the optical low-pass filter 417 are provided as well.

In terms of operation, the image of the subject has its optical path bent by the mirror 1001 so as to be introduced to the lens barrel 402 in a manner similar to that of the 14th embodiment. The mirror 1001 is provided with the hole 1002 for transmitting the incident light without bending it. Modulated signal light from the light-emitting element 1501 is led to the exterior of the case 102 via the hole 1002 and the window 100 through which light passes.

By adopting a design in which the hole 1002 is provided outwardly of the field angle of the lens barrel 402, the captured picture will not be affected by the hole 1002 and a function for emitting modulated signal light such as remote-control signal light can be incorporated while maintaining compactness.

Since the light-emitting element 1501 is disposed in the extra triangular space in back of the mirror 1001, a more compact apparatus can be obtained.

(17th Embodiment)

Figure 23:
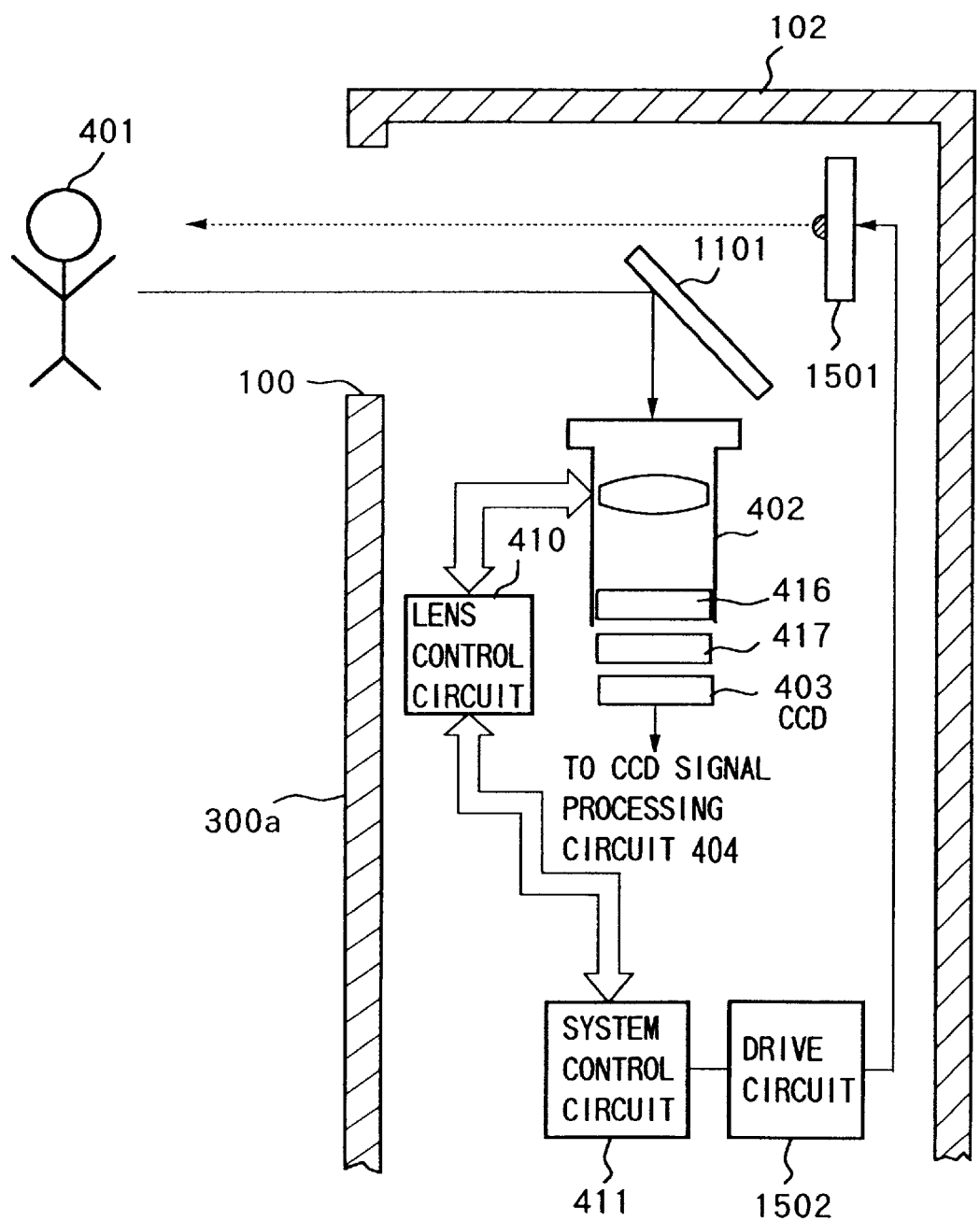
FIG. 23 is a structural view showing a 17th embodiment of the present invention.

FIG. 23 illustrates a 17th embodiment of the present invention. Here a mirror 1101 and the light-emitting element 1501 are provided instead of the mirror 1001 of FIG. 22 in such a manner that the modulated signal light will pass on the outer side of the mirror 1101.

According to this embodiment, the hole 1002 is not provided, thus making it possible to achieve compactness through an even simpler arrangement.

(18th Embodiment)

The modulated signal light is not limited to remote-control signal light. If a comparatively large transmission capacity is utilized to transmit e.g. a video signal or an audio signal and a method of use similar to that of FIG. 9 is adopted, wireless editing can be performed without the connections 607, 608, 609.

FIG. 24 is a diagram illustrating an example of an image sensing optical system and peripheral components as well as a stationary VTR in the tenth through 17th embodiment of the present invention. Blocks having functions identical with those described in the foregoing embodiments are designated by like reference numerals.

In a manner similar to that described in the 14th embodiment, the sensed light S1 from the subject 401 is introduced to the lens barrel 402 by having its optical path bent by the mirror 101. After the light is converted to an electric signal via the optical low-pass filter 417 and CCD 403, the signal is subjected to various processing and is recorded on the video tape 408a by the recording mechanism 408.

The video camera 102 shown in FIG. 24 is equipped with an image memory 2002. When a switch (not shown) in the key unit 412, for example, is operated, the system control circuit 411 transmits an instruction via the video signal processing circuit 406. Video prevailing at the moment the switch is operated can be captured as a still picture from the moving video provided by the camera signal processing circuit 405. Further, a playback RF signal reproduced by the recording mechanism 408 can be demodulated to a video signal by the video signal processing circuit 801, and video prevailing at the moment the above-mentioned switch is operated can be captured as a still picture from the moving video that has been demodulated.

The still picture captured in the image memory 2002 as set forth above is output to a terminal B of a switch 1003 via the video signal processing circuit 406 in accordance with the instruction from the system control circuit 411. At this time the switch 1003 is connected to the side of terminal B by the system control circuit 411, whereby the still-picture output signal of the image memory 2002 is introduced to a combining circuit 1004. The combining circuit 1004 combines the remote-control signal output by the system control circuit 411 and the still-picture output signal from the image memory 2002 and outputs the combined signal to a modulator circuit 1005. The modulator circuit 1005 modulates the combined signal from the combining circuit 804 for the purpose of producing signal light whose format is in conformity with the stationary VTR 1001. The modulated signal is output to the light-emitting element 1501.

The emitted modulated signal light is the signal light S2 containing both image information and remote-control information. This light propagates through the dichroic mirror 101, exits to the exterior of the case 300 via a window 300b through which light passes and is received by a light-receiving element 1406 from a light-receiving window 1405 of the stationary VTR 2001. The output signal of the light-receiving element 1406 is introduced to a demodulator circuit 1406, whereby the signal is demodulated. The demodulated signal is then applied to a distribution circuit 1411, which distributes the signal as a video signal and a remote-control signal. The video signal is introduced to a video signal processing circuit and the remote-control signal to a system control circuit.

If the switch 1003 is made to contact the side of terminal A by an instruction from system control circuit 411, the video currently being captured via the lens barrel 402 can be transmitted to the stationary VTR 2001. Further, by connecting switch 1003 to terminal B in accordance with a command from the system control circuit 411 and controlling the video signal processing circuit 4006, a moving picture currently being played back by the recording mechanism 408, or a still picture obtained by storing one frame of this moving picture in the image memory, can be transmitted to the stationary VTR 1001. Furthermore, by additionally providing the video signal processing circuit 406 with an audio signal processing function, it is possible to transmit not only video information but also audio information.

By adopting the arrangements of the 10th through 18th embodiments in the manner described above, light of a prescribed wavelength, such as infrared light, is prevented from impinging upon the image sensing means. This makes it possible to dispense with a filter such as an infrared cutting filter.

Since the optical path bending means allows the signal light of the remote controller to pass, it is possible to dispense with the conventional remote-control light-receiving window.

Since the light-receiving means for receiving the signal light is placed in the space produced in back of the optical path bending means, the apparatus can be made more compact without sacrificing camera performance.

The light-transmitting means and light-receiving means can be provided in the space in back of the optical-path bending means. This makes it possible to obtain a more compact apparatus with sacrificing camera performance.

Another advantage is that light inclusive of signal light can be transmitted reliably. In addition, the light inclusive of the signal light can be transmitted through a simpler arrangement.

Since the light of a prescribed wavelength, such as infrared light, is prevented from impinging upon the image sensing means, modulated signal light from a light-emitting element provided in back of a mirror can be emitted to the exterior of the case while dispensing with a filter such as an infrared cutting filter.

Since the optical path bending means transmits the modulated signal light, it is possible to dispense with the conventional light-emitting window for the modulated signal light.

Since the light-emitting means for emitting the signal light is placed in the space produced in back of the optical path bending means, the apparatus can be made more compact without sacrificing camera performance.

Since the light-emitting means can be provided in the space in back of the optical path bending means, the apparatus can be made more compact without sacrificing camera performance.

Furthermore, light inclusive of signal light can be transmitted reliably. In addition, the light inclusive of the signal light can be transmitted through a simpler arrangement.

OTHER EMBODIMENTS OF THE INVENTION

The present invention can be applied to a system constituted by a plurality of devices (e.g., a host computer, interface, reader, printer, etc.) or to an apparatus comprising a single device (e.g., a copier or facsimile machine, etc.).

Further, in order that various devices may be operated so as to implement the functions of the foregoing embodiments, the program codes of software for implementing the functions of the embodiments may be supplied to a computer within an apparatus or system to which the devices are connected and the various devices may be operated in accordance with a program that has been stored in the computer (CPU or MPU) of the system or apparatus. Such embodiments also are covered by the present invention.

In this case, the program codes of the software themselves implement the functions of the embodiments, and the program codes per se as well as means for supplying the computer with the program codes, such as a recording medium storing such program codes, constitute the invention. Examples of storage media that can be used for storing such program codes are a floppy disk, hard disk, optical disk, magneto-optical disk, CD-ROM, CD-R, magnetic tape, non-volatile type memory card or ROM.

Furthermore, besides the case where the aforesaid functions according to the embodiments are implemented by executing the supplied program codes by a computer, it goes without saying that the program codes are included in embodiments of the invention also in a case where the functions of the foregoing embodiments are implemented in cooperation with an operating system (OS) or other application software running on the computer.

Furthermore, the present invention further covers a case where, after the supplied program codes are stored in a memory provided on a function extension board of the computer or on a function extension unit connected to the computer, a CPU or the like provided on the function extension board or function extension unit performs a part of or the entire actual process in accordance with the designation of program codes and implements the functions of the above embodiments by this processing.

It should be noted that the foregoing embodiments of the present invention may be implemented. independently or in any combination that is suitable.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   a first light-emitting element for emitting a first signal light;
   an opening for leading the first signal light, which is emitted by said first light-emitting element, to the exterior of a case, and for introducing sensed light from a subject into the interior of the case and a second signal light emitted by a second light-emitting element from the exterior into the interior of the case;
   an image sensing lens for receiving, within the interior of the case, the sensed image light from the subject that as entered the interior of the case via said opening; and
   optical bending device for bending the optical path of the sensed light from the subject and the optical path of the signal lights;
   wherein said optical path bending device comprises at least two mirrors coupled to one another and disposed on the same plane; and
   wherein after the bending of the optical path by said optical path bending device is performed, the sensed light from the subject is received by said image sensing lens and the first signal light from said first light-emitting element is led to the exterior of the case via said opening, and has an optical path substantially parallel to said second signal light.

2. The apparatus according to claim 1, wherein said optical path bending device bends the signal light from the subject and the signal light from said light-emitting element by approximately 90°.

3. The apparatus according to claim 1, wherein a portion of said optical path bending device is constituted by an element having a property which reflects light of a specific wavelength corresponding to wavelength of the signal light.

4. The image sensing apparatus of claim 1, wherein said second light-emitting element is a remoter controller held by the subject or a photographer.

5. An image sensing apparatus comprising:
- a first light-emitting element for emitting a first signal light;
- an opening for leading the first signal light, which is emitted by said first light-emitting element by said first light-emitting element, to the exterior of a case, and for introducing sensed light from a subject and a second signal light emitted by a second light-emitting element from the exterior into the interior of the case;
- a light-receiving element for receiving the second signal light, which has been introduced into the interior of the case via said opening, in the interior of the case;
- optical path bending device for bending the optical path of the sensed light from the subject and the optical path of the first and second signal lights; and
- an image sensing lens for receiving, in the interior of the case, sensed light from the subject that has entered the interior of the case via said opening;
- wherein said optical path bending device comprises at least two mirrors coupled to one another and disposed on the same plane; and
- wherein after the sensed light from the subject and the second signal light from the exterior is bent by said optical path bending device, the sensed light and the second signal light is received by said image sensing lens and light-receiving element, respectively, and after the first signal light emitted by said first light-emitting element is bent by said optical path bending device, this first signal light is led to the exterior of the case via said opening.

6. The apparatus according to claim 5, wherein said optical path bending device bends the sensed light from the subject and the first and second signal light from said light-emitting element by approximately 90°.

7. The apparatus according to claim 5, wherein a portion of said optical path bending device that bends the first and second signal light is constituted by an element having a property which reflects light of a specific wavelength corresponding to the wavelength of the first and second signal light.

8. The image sensing apparatus of claim 5, wherein said second light-emitting element is a remoter controller held by the subject or a photographer.

9. An image sensing apparatus comprising:
- a first light-emitting element for emitting signal light;
- an opening for leading the signal light, which is emitted by said first light-emitting element, to the exterior of a case, and for introducing sensed light from a subject into the interior of the case and a second signal light emitted by a second light-emitting element from the exterior into the interior of the case; and
- optical path bending device for bending the optical path of the signal light;
- wherein said optical path bending device comprises at least two mirrors coupled to one another on the same plane; and
- wherein the signal light, after being bent by said optical path bending device, is led to the exterior of the case via said opening.

10. The apparatus according to claim 9, wherein said optical path bending device bends the signal light by approximately 90°.

11. The apparatus according to claim 9, wherein said optical path bending device is constituted by an element having a property which reflects light of a specific wavelength corresponding to wavelength of the signal light.

12. The image sensing apparatus of claim 9, wherein said second light-emitting element is a remoter controller held by the user or a photographer.

13. An image sensing apparatus comprising:
- a first light-emitting element for emitting a first signal light;
- an opening for leading the first signal light, which is emitted by said first light-emitted element, to the exterior of a case, and for introducing sensed light from a subject and a second signal light emitted by a second light emitting element from the exterior into the interior of the case; and
- a light-receiving element for receiving the second signal light, which has been introduced into the interior of the case via said opening, in the interior of the case; and
- optical path bending device for bending the optical path of the first and second signal lights and said sensed light;
- wherein said optical path bending device comprising at least two mirrors coupled to one another and disposed on the same plane;
- wherein the second signal light bent by said optical path device is received by said light-receiving element and the first signal light emitted by said first light-emitting element is led to the exterior of the case via said opening after the optical path of the light signal is bent by said optical path bending device.

14. The apparatus according to claim 13, wherein said optical path bending device bends the signal light by approximately 90°.

15. The apparatus according to claim 13, wherein said optical path bending device is constituted by an element having a property which reflects light of a specific wavelength corresponding to wavelength of the first and second signal light.

16. The image sensing apparatus of claim 13, wherein said second light-emitting element is a remoter controller held by the user or a photographer.

17. An image sensing apparatus comprising:
- a first light-emitting element for emitting a first signal light;
- an opening for leading the first signal light, which is emitted by said first light-emitting element by said light-emitting element, to the exterior of a case, and for introducing sensed light from a subject and a second signal light emitted by a second light-emitting element from the exterior into the interior of the case;
- a light-receiving element for receiving the second signal light, which has been introduced into the interior of the case via said opening, in the interior of the case;
- optical path bending device for bending the optical path of the sensed light from the subject and the optical path of the first and second signal lights; and
- wherein said optical path bending device comprises at least two mirrors coupled to one another and disposed on the same plane; and an image sensing lens for receiving, in the interior of the case, sensed light from the subject that has entered the interior of the case via said opening;

Wherein after the sensed light from the subject and the second signal light from the exterior is bent by said optical path bending device, the sensed light and the second signal light is received by said image sensing lens and light-receiving element, respectively, and after the first signal light emitted by said first light-emitting element is bent by said optical path bending device, this first signal light is led to the exterior of the case via said opening.

18. The apparatus according to claim 17, wherein said optical path bending device bends the sensed light from the subject and the first and second signal light from said light-emitting element by approximately 90°.

19. The apparatus according to claim 17, wherein a portion of said optical path bending device that bends the first and second signal light is constituted by an element having a property which reflects light of a specific wavelength corresponding to the wavelength of the first and second signal light.

20. The image sensing apparatus of claim 17, wherein said second light-emitting element is a remoter controller held by the user or a photographer.

* * * * *